United States Patent
Nakashima et al.

(10) Patent No.: US 8,526,828 B2
(45) Date of Patent: Sep. 3, 2013

(54) OPTICAL TRANSMITTER AND OPTICAL TRANSMITTER UNIT

(75) Inventors: Hisao Nakashima, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 174 days.

(21) Appl. No.: 13/267,909

(22) Filed: Oct. 7, 2011

(65) Prior Publication Data

US 2012/0141130 A1 Jun. 7, 2012

(30) Foreign Application Priority Data

Dec. 2, 2010 (JP) .................................. 2010-269020

(51) Int. Cl.
*H04B 10/04* (2012.12)

(52) U.S. Cl.
USPC ............................ 398/188; 185/195; 185/198

(58) Field of Classification Search
None
See application file for complete search history.

(56) References Cited

U.S. PATENT DOCUMENTS

| | | | |
|---|---|---|---|
| 7,184,671 B2 | 2/2007 | Wang | |
| 7,986,878 B2 | 7/2011 | Saunders et al. | |
| 8,406,635 B2 * | 3/2013 | Nakashima et al. | 398/158 |
| 2009/0009259 A1 | 1/2009 | Ohira et al. | |
| 2009/0238580 A1 * | 9/2009 | Kikuchi | 398/192 |
| 2010/0111531 A1 * | 5/2010 | Tanimura et al. | 398/65 |
| 2010/0150577 A1 | 6/2010 | Essiambre et al. | |
| 2011/0170869 A1 * | 7/2011 | Mandai et al. | 398/65 |
| 2012/0008963 A1 * | 1/2012 | Aruga et al. | 398/183 |

FOREIGN PATENT DOCUMENTS

EP 0840468 A2 5/1998

OTHER PUBLICATIONS

Ly-Gagnon, Dany-Sebastien "Coherent Detection of Optical Quadrature Phase-Shift Keying Singals With Carrier Phase Estimation", IEEE JLT vol. 24, No. 1, Jan. 2006, pp. 12-21.
McGhan, D. "Electronic Dispersion Compensation", OFC 2006 OWK1, pp. 1-30.
Extended European Search Report dated Mar. 27, 2012 for corresponding European Application No. 11186671.1.

* cited by examiner

*Primary Examiner* — Danny Leung
*Assistant Examiner* — Jai Lee
(74) *Attorney, Agent, or Firm* — Fujitsu Patent Center

(57) ABSTRACT

The optical transmitter includes a light source; a signal processor; an optical modulator that modulates output light from the light source in accordance with a transmitting signal subjected to digital signal processing in the signal processor and outputs the modulated light as a light signal to a transmission path; and a control circuit that controls a carrier-wave frequency of the light signal output from the optical modulator, the signal processor including a mapping circuit that maps the transmitting signal to electric-field information according to a modulating scheme, and a phase rotating circuit that provides a phase rotation having a constant cycle to an electric-field phase of the electric-field information to which the mapping circuit maps the transmitting signal, the control circuit controlling the cycle of the phase rotation that the phase rotating circuit provides and thereby controlling the carrier-wave frequency of the light signal output from the optical modulator.

20 Claims, 22 Drawing Sheets

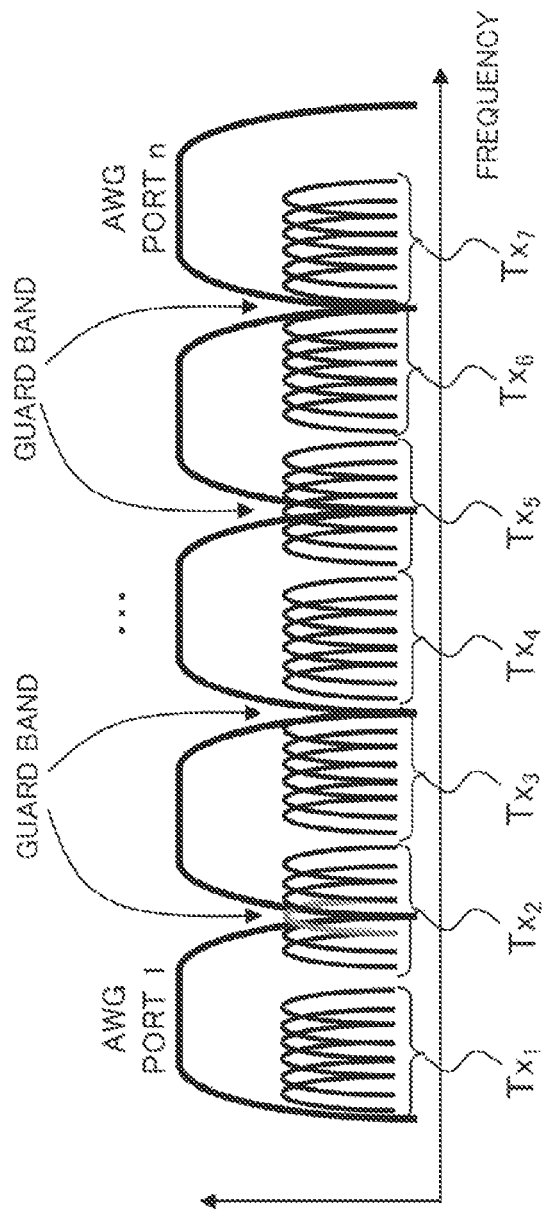

OPTICAL TRANSMITTER AND OPTICAL TRANSMITTER UNIT

CROSS-REFERENCE TO RELATED APPLICATION

This application is based upon and claims the benefit of priority of the prior Japanese Patent Application No. 2010-269020, filed on Dec. 2, 2010, the entire contents of which are incorporated herein by reference.

FIELD

The embodiments discussed herein are an optical transmitter, and an optical transmitter unit that includes a number of optical transmitters and carries out wavelength multiplexing.

BACKGROUND

In accordance with increase in data traffic, a high-capacity trunk light communication network has been demanded, and high-speed communication of 40 Gbps (Giga bit per second) or 100 Gbps are putting into practice. For high-speed communication in an optical communication network, one of the techniques recently focused is optical transmission and optical reception using digital signal processing.

[Non-Patent Literature 1] D.-S. Ly-Gagnon, et al. "Coherent Detection of Optical Quadrature Phase-Shift Keying Signals With Carrier Phase Estimation", IEEE JLT, vol. 24, no. 1, pp. 12-21, January 2006

[Non-Patent Literature 2] D. McGhan, "Electronic Dispersion Compensation", OFC2006, OWK1

In general, a wavelength locker having, for example, an etalon filter is used to stably output light having a constant oscillation frequency (wavelength) from a transmitting light source used in a wavelength multiplexed optical transmission system. Considering aged deterioration, the accuracy of control by such a wavelength locker is several GHz. Fluctuation of this several GHz causes lowering the transmission capability in an optical transmission system and hinders high-density intervals of wavelengths to be multiplexed in a single optical fiber. In other words, frequency stability of a transmission light source is factors limiting the transmitting distance in an optical transmission system and a transmission capacity of a single optical fiber.

An oscillation frequency (wavelength) of a transmission light source is generally controlled by temperature, which takes time to make it difficult to flexibly change the wavelength arrangement particularly during the operation of the optical transmission system. More specifically, such control may take several minutes and the oscillation frequency to be controlled may have poor stability. In addition, it is difficult to accomplish complex and precise control while the system is working.

SUMMARY

As one aspect of the embodiments, an optical transmitter including a light source; a signal processor that carries out digital signal processing on a transmitting signal to be transmitted; an optical modulator that modulates output light from the light source in accordance with the transmitting signal subjected to the digital signal processing in the signal processor and outputs the modulated light as a light signal to a transmission path; and a carrier-wave frequency control circuit that controls a carrier-wave frequency of the light signal output from the optical modulator, the signal processor including a mapping circuit that maps the transmitting signal to electric-field information according to a modulating scheme, and a phase rotating circuit that provides a phase rotation having a constant cycle to an electric-field phase of the electric-field information to which the mapping circuit maps the transmitting signal, the carrier-wave frequency control circuit controlling the cycle of the phase rotation that the phase rotating circuit provides and thereby controlling the carrier-wave frequency of the light signal output from the optical modulator.

As another aspect, an optical transmitter unit including a plurality of the above optical transmitters; and an optical coupler that carries out wavelength multiplexing by combining a plurality of the light signals one output from each of the plurality of optical transmitters to the transmission path, wherein a plurality of the light sources, provided one for each of the plurality of optical transmitters, oscillate output light having a same frequency, a plurality of the carrier-wave frequency control circuits, provided one for each of the plurality of optical transmitters, fine-adjust the carrier-wave frequencies of the light signals output from the optical modulators by controlling cycles of the phase rotation that the corresponding phase rotating circuits provide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 22 is a diagram illustrating a transmitting spectrum of an optical transmitter unit of FIG. 21.

DESCRIPTION OF THE PREFERRED EMBODIMENTS

Hereinafter, various embodiments will now be described with reference to the drawings.

Figure 1:
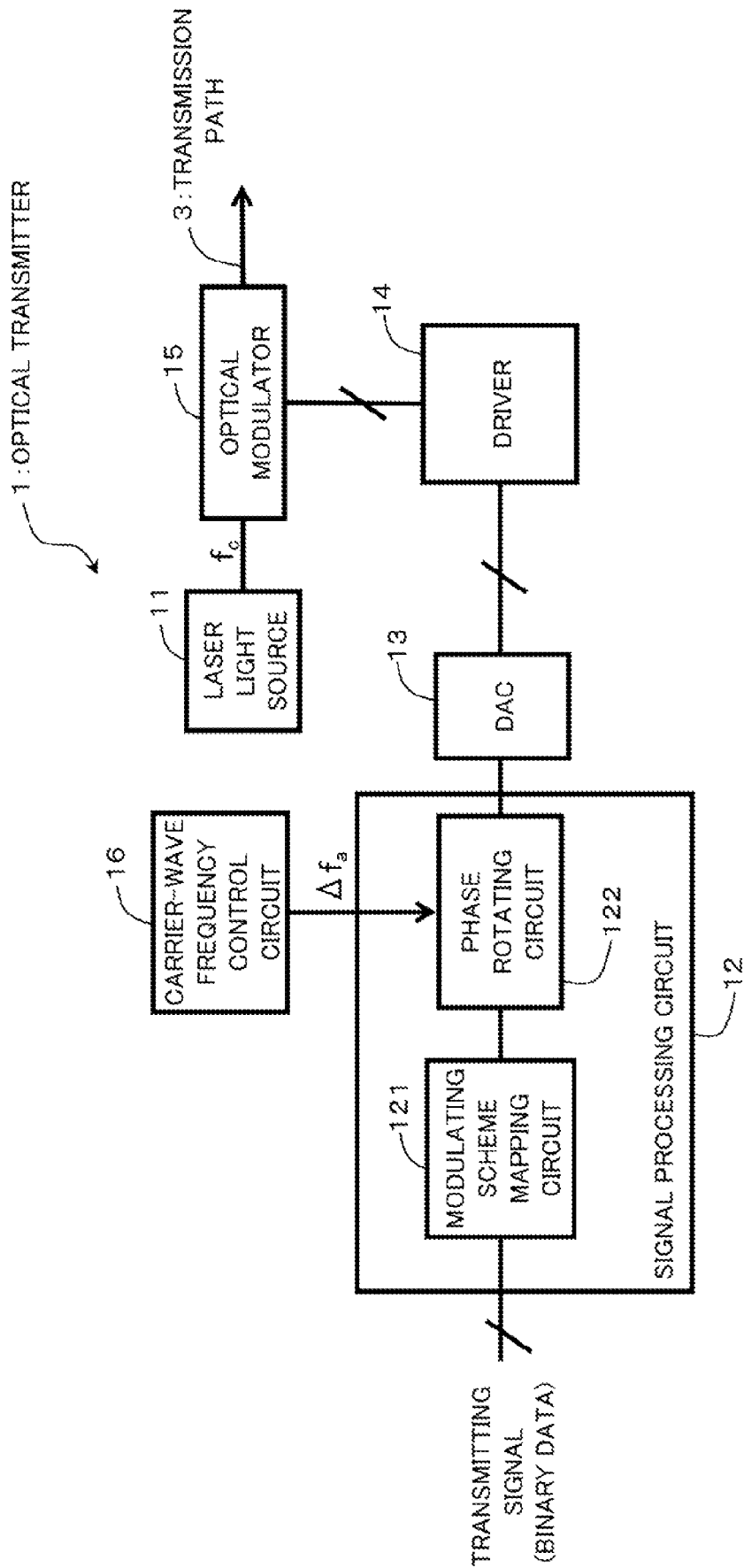
FIG. 1 is a block diagram schematically illustrating the basic configuration of an optical transmitter.

(1) Basic Configuration of an Optical Transmitter:

FIG. 1 is a block diagram illustrating the basic configuration of an optical transmitter. The optical transmitter 1 having the basic configuration of FIG. 1 includes a laser light source 11, a signal processing circuit 12, a DAC 13, a driver 14, an IQ modulator 15, and a carrier-wave frequency control circuit 16.

The laser light source (light source) 11 oscillates output light having a predetermined frequency $f_C$.

The signal processing circuit (signal processor) 12 carries out digital signal processing on a transmitting signal which is input from an external device and which is binary data, and is exemplified by a DSP (Digital Signal Processor). The signal processing circuit 12 has functions of a modulating scheme mapping circuit 121 and a phase rotating circuit 122.

The modulating scheme mapping circuit 121 constellation-maps a transmitting signal which is input from an external device and which is binary data to electric-field information in accordance with a modulating scheme such as QPSK (Quadrature Phase Shift Keying), QAM (Quadrature Amplitude Modulation), and OFDM (Orthogonal Frequency Division Multiplexing). If a modulation scheme such as RZ (Return to Zero) or NRZ (Non Return to Zero) is adopted, it is sufficient that the transmitting data in the form of binary data is simply converted into the electric-field information.

The phase rotating circuit 122 provides a phase rotation of a predetermined cycle to the electric-field phase of the electric-field information, to which the modulating scheme mapping circuit 121 maps the transmitting signal. Specifically, the phase rotating circuit 122 provides, upon receipt of an amount $\Delta f_a$ of frequency control from the carrier-wave frequency control circuit 16, a phase rotation $\theta = 2\pi\Delta f_a t$ to the electric-field phase.

The DAC (digital/analog converting circuit) 13 converts a digital signal from the signal processing circuit 12 into an analog signal.

The driver (modulator driving circuit) 14 amplifies the signal from the DAC 13, and drives the IQ modulator 15 using the amplified signal.

The optical modulator (optical modulating section) 15 modulates the output light from the laser light source 11 in accordance with the transmitting signal after being subjected to the digital processing by the signal processing circuit 12 and the processing by the DAC 13 and the driver 14, and then outputs the modulated light, being regarded as a light signal, to the transmission path 3.

The carrier-wave frequency control circuit 16 controls the carrier-wave frequency of the light signal output from the optical modulator 15. Specifically, for the control of the carrier-wave frequency of the light signal output from the optical modulator 15, the carrier-wave frequency control circuit 16 outputs an amount $\Delta f_a$ of frequency control to the phase rotating circuit 122 to control the cycle of phase rotation $\theta = 2\pi\Delta f_a t$ that the phase rotating circuit 122 applies. The carrier-wave frequency control circuit 16 fine-adjusts the carrier-wave frequency of a light signal output from the optical modulator 15 in the electric band of the optical transmitter 1 of the first embodiment through the above frequency control. The electric band of the optical transmitter 1 depends on the band properties of the DAC 13, the driver 14, and the optical modulator 15.

In the optical transmitter 1, which has the above basic configuration, the carrier-wave frequency control circuit 16 outputs an amount $\Delta f_a$ of frequency control to the phase rotating circuit 122, so that the cycle of the phase rotation $\theta = 2\pi\Delta f_a t$ that the phase rotating circuit 122 provides is controlled. This fine-adjusts the carrier-wave frequency of the light signal output from the optical modulator 15 to a value of the sum of the frequency $f_C$ of the output light from the laser light source 11 and an amount $\Delta f_a$ of frequency control within the electric band of the optical transmitter 1.

Accordingly, use of the amount $\Delta f_a$ of frequency control makes the optical transmitter 1 possible to control the carrier-wave frequency of the light signal output from the optical modulator 15 more precisely and faster than the conventional method that directly controls the laser light source 11. This ensures the stability of the oscillation frequency of the laser light source 11, so that the transmission performance of an optical communication system using the optical transmitter 1 is improved. In addition, wavelength multiplexing intervals come to be dense to improve the rate of using the band of the transmission path (optical fiber) 3 and high-capacity transmission is realized.

Figure 2:
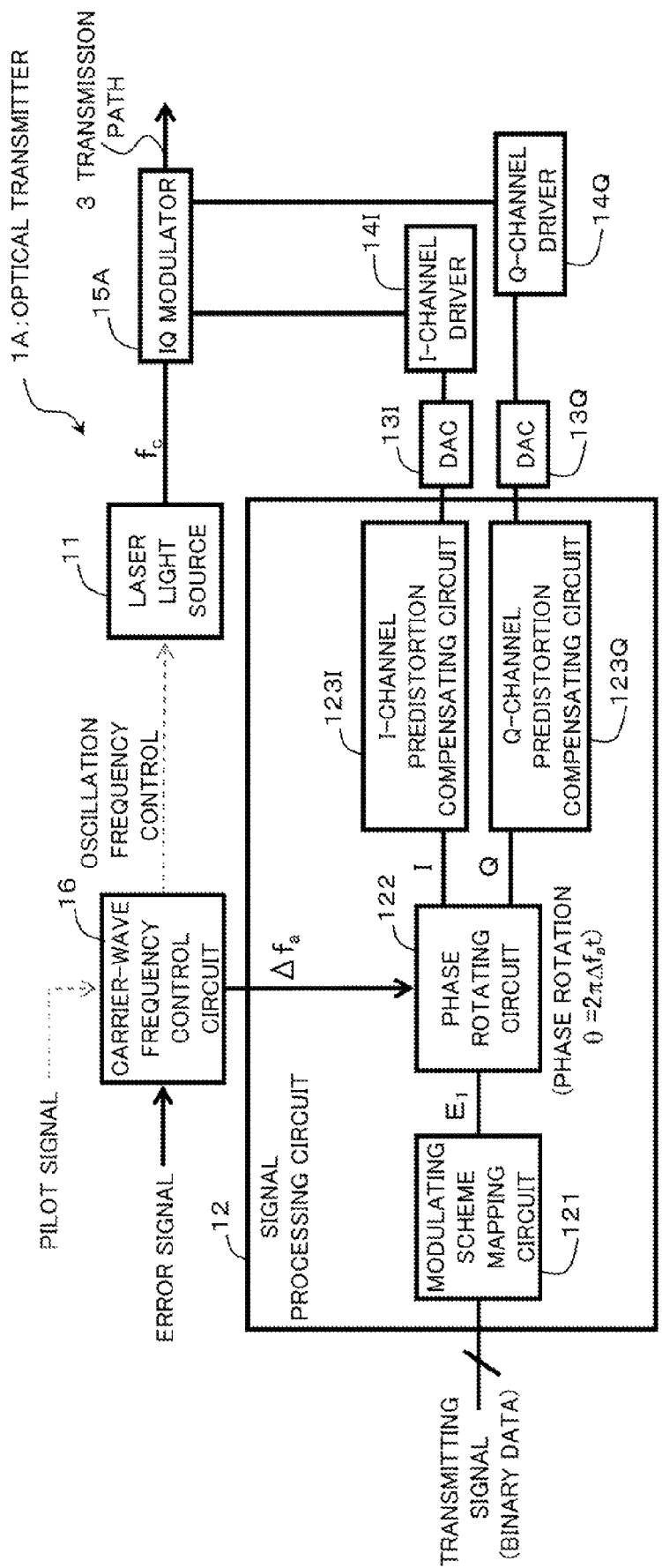
FIG. 2 is a block diagram schematically illustrating the configuration of an optical transmitter according to a first embodiment.

(2) The Optical Transmitter of the First Embodiment:

FIG. 2 is a block diagram schematically illustrating the configuration of an optical transmitter 1A of the first embodiment. The optical transmitter 1A includes a laser light source 11, a signal processing circuit 12, DACs 13I and 13Q, drivers 14I and 14Q, an IQ optical modulator 15A, and the carrier-wave frequency control circuit 16.

The laser light source 11 oscillates output light having a predetermined frequency $f_C$.

The signal processing circuit (signal processor) 12 carries out digital signal processing on a transmitting signal which is input from an external device and which is binary data. The signal processing circuit 12 has functions of a modulating scheme mapping circuit 121, a phase rotating circuit 122, an I-channel predistortion compensating circuit 123I, and Q-channel predistortion compensating circuit 123Q.

Likewise the optical transmitter 1 of FIG. 1, the modulating scheme mapping circuit 121 constellation-maps a transmitting signal which is input from an external device and which is binary data to electric-field information in accordance with a modulating scheme such as QPSK, QAM, and OFDM. The electric-field information E1, to which the modulating scheme mapping circuit 121 maps the transmitting signal, includes an I (In-phase) component and a Q (Quadrature-phase) component, and is expressed by Formula $E_1 = I + j \cdot Q = A$ (t)·exp(jθ(t)) where the term "j" represents the imaginary unit; the term "A(t)" represents an electric-field intensity (amplitude); the term "θ(t)" represents an electric-field phase; and the term "t" represents time.

The phase rotating circuit 122 provides a phase rotation of a predetermined cycle to the electric-field phase of the electric-field information $E_1$, to which the modulating scheme mapping circuit 121 maps the transmitting signal. Specifically, the phase rotating circuit 122 applies, upon receipt of an amount $\Delta f_a$ of frequency control from the carrier-wave frequency control circuit 16, a phase rotation $\theta = 2\pi\Delta f_a t$ to the electric-field phase of the electric-field information $E_1$ similarly to the optical transmitter 1 of FIG. 1.

Figure 4:
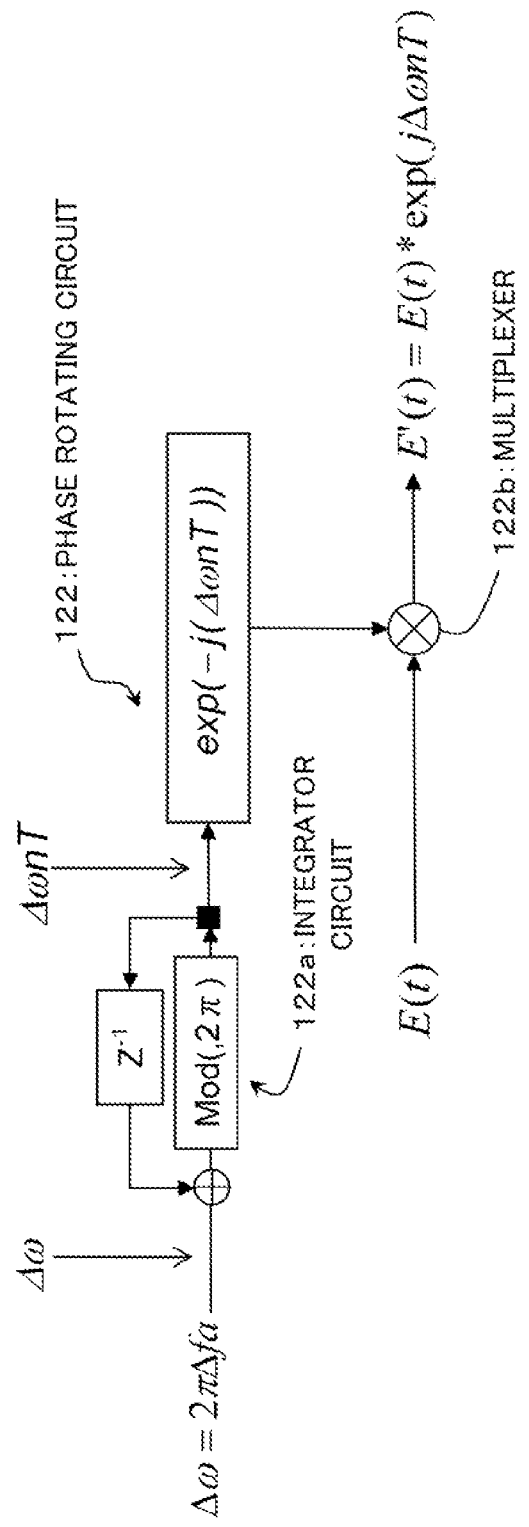
FIG. 4 is a block diagram schematically illustrating the configuration of a phase rotating circuit.

As illustrated in FIG. 4, which is a block diagram illustrating the configuration of the phase rotating circuit 122, the phase rotating circuit 122 includes an integrator circuit 122a and a multiplexer 122b. The integrator circuit 122a integrates, upon receipt of the amount $\Delta f_a$ of frequency control from the carrier-wave frequency control circuit 16, an amount $\Delta\omega(=2\pi\Delta f_a)$ of phase rotation per discrete time unit T and thereby calculates a complex electric field information exp($-j(\Delta\omega nT)$) that rotates the phase by $\Delta\omega nT$ during a discrete time nT (here, n is an integer). The multiplexer 122b multiplies the complex electric field information exp($-j(\Delta\omega nT)$), which the integrator circuit 122a calculates, by the electric-field information E(t) ($=E_1$) from the modulating scheme mapping circuit 121, and thereby obtains and outputs electric-field information E'(t)=E(t)*exp(j$\Delta\omega nT$), to which the electric-field phase of the electric-field information E(t) is rotated by $\Delta\omega nT(=2\pi\Delta f_a t)$.

The I-channel predistortion compensating circuit 123I compensates the I component of the electric-field information, to which the phase rotating circuit 122 provides the phase rotation, for prospective deterioration in signal quality of the I component of the electric-field information, which deterioration is caused by incompletion of a transmitting system corresponding to the I component. Similarly, the Q-channel predistortion compensating circuit 123Q compensates the Q component of the electric-field information, to which the phase rotating circuit 122 provides the phase rotation, for prospective deterioration in signal quality of the Q component of the electric-field information, which deterioration is caused by incompletion of a transmitting system corresponding to the Q component. Here, an example of the transmitting system corresponding to the I component includes DAC 13I, the driver 14I, and a phase modulator 151I that are to be detailed below; and an example of the transmitting system corresponding to the Q component includes the DAC 13Q, the driver 14Q, and a phase modulator 151Q that are to be detailed below. The I-channel predistortion compensating circuit 123I and the Q-channel predistortion compensating circuit 123Q compensate for, for example, a loss variation between I and Q signals, skew, a band variation, linearity. As detailed below, the compensation is accomplished by multiplying (convolving) the electric-field information from the phase rotating circuit 122 by the reversed function of a waveform distortion of the optical transmitter 1A (the transmitting system).

The DACs 13I and 13Q convert digital signals (I component and Q component) from the I-channel predistortion compensating circuit 123I and the Q-channel predistortion compensating circuit 123Q, respectively into analog signals.

The drivers 14I and 14Q amplify signals from the DACs 13I and 13Q, and drive the respective corresponding phase modulator 151I and 151Q (see FIG. 5) in the IQ modulator 15A using the amplified signals.

Figure 5:
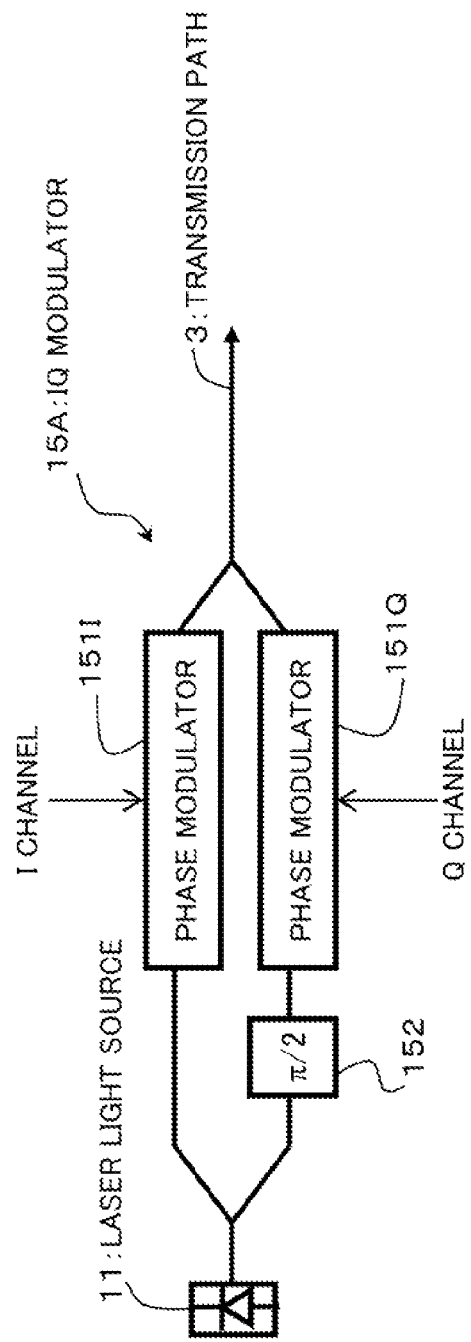
FIG. 5 is a block diagram schematically illustrating the configuration of an IQ modulator.

The IQ modulator (optical modulator) 15A modulates output signal from the laser light source 11 using the transmitting signals (the I component and the Q component) processed by the DACs 13I and 13Q and the drivers 14I and 14Q after being subjected to the digital processing by the signal processing circuit 12, and outputs the modulated light, being regarded as a light signal, to the transmission path 3. As illustrated in FIG. 5, the IQ modulator 15A includes the phase modulator 151I for an I component, the phase modulator 151Q for a Q component, and a phase shifter 152. FIG. 5 is a block diagram schematically illustrates the configuration of the IQ modulator 15A. The phase shifter 152 provides a predetermined phase difference ($\pi/2$) between a pair of light signals propagating through the phase modulator 151I and the phase modulator 151Q, and is disposed on the side of the phase modulator 151Q. The phase modulator 151I and the phase modulator 151Q phase-modulate the pair of light signals that have the predetermined phase difference provided on the basis of the transmitting signals (the I component and the Q component) from the drivers 14I and 14Q, and output the modulated signals to the transmission path 3.

Figure 3:
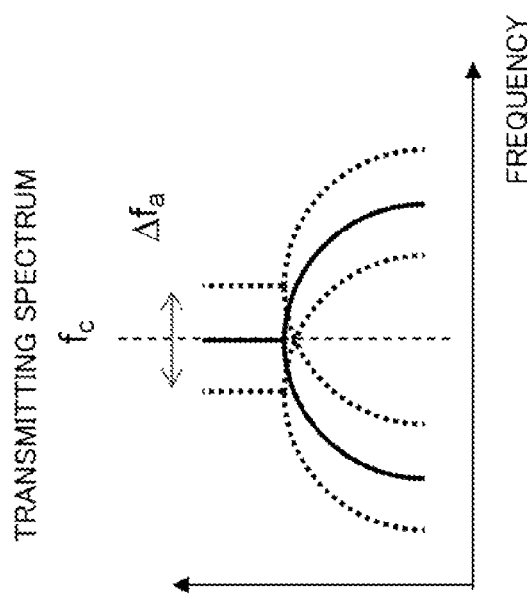
FIG. 3 is a diagram illustrating a transmitting spectrum of an optical transmitter of the first embodiment.

Likewise the optical transmitter 1 of FIG. 1, the carrier-wave frequency control circuit 16 controls the carrier-wave frequency of the light signal output from the IQ modulator 15A. Specifically, for the control of the carrier-wave frequency of the light signal output from the optical modulator 15, the carrier-wave frequency control circuit 16 outputs an amount $\Delta f_a$ of frequency control to the phase rotating circuit 122 to control the cycle of phase rotation $\theta = 2\pi\Delta f_a t$ that the phase rotating circuit 122 applies. Through the above frequency control, the carrier-wave frequency control circuit 16 fine-adjusts the carrier-wave frequency of the light signal output from the IQ modulator 15A within the electric band of the optical transmitter 1A of the first embodiment as illustrated in, for example, FIG. 3. The electric band of the optical transmitter 1A depends on the band properties of the DACs 13I and 13Q, the drivers 14I and 14Q, and the IQ modulator 15A. FIG. 3 illustrates a transmitting spectrum of the optical transmitter 1A of the first embodiment.

In accordance with an error signal from an optical receiver 2A or 2B (see FIGS. 9-11) in communication with the optical transmitter 1A, the carrier-wave frequency control circuit 16 fine-adjusts the carrier-wave frequency within the electric band of the optical transmitter 1A by adjusting the rotating frequency that the phase rotating circuit 122 applies so that the error at the receiver end is resolved. Here, an error signal is related to the result of quality of a received signal received by the optical receiver 2A or 2B, and represents occurrence of deterioration in quality of received signal in the receiver end, as to be detailed below with reference to FIGS. 10 and 11. Such an error signal may be transmitted from the optical receiver 2A or 2B to the optical transmitter 1A through a reverse-direction channel; through a control channel of the optical communication system; or through frequency modulating (to be detailed below), that is a novel function of the optical transmitter 1A. Alternatively, the carrier-wave frequency may be fine-adjusted on the basis of a light spectrum or a light frequency measured by means of a transmitter output, a relay, or a receiver.

Further alternatively, the carrier-wave frequency control circuit 16 may superimpose a pilot signal onto a frequency adjusting value $\Delta f_a$. Specifically, the carrier-wave frequency control circuit 16 may have a function of superimposing a pilot signal onto a carrier-wave frequency of a light signal that the IQ modulator 15A outputs through frequency modulation by controlling the cycle of the phase rotation $\theta = 2\pi\Delta f_a t$ that the phase rotating circuit 122 applies to thereby control the carrier-wave frequency of the light signal output from the IQ modulator 15A, and transmits the superimposed signal to the receiver end through the transmission path 3. Besides, the carrier-wave frequency control circuit 16 may superimpose a result of detecting a quality of a received signal of the reverse-direction channel, specifically being the above error signal and serving as a pilot signal, onto the carrier-wave frequency through frequency modulation. If such frequency modulation is carried out, the light receiver 2B should have a function of demodulating a pilot signal subjected to the frequency modulation from the carrier wave as to be detailed below with reference to FIG. 11.

Furthermore, the carrier-wave frequency control circuit 16 may superimpose dither for detecting quality of a received signal onto the carrier-wave frequency of a light signal that the IQ modulator 15A outputs by controlling the cycle of the phase rotation $\theta=2\pi\Delta f_a t$ that the phase rotating circuit 122 applies and transmit the superimposed dither to the receiver end (the optical receiver 2A or 2B) through the transmission path 3.

When the carrier-wave frequency is to be adjusted beyond the electric band of the transmitter, the carrier-wave frequency control circuit 16 may carry out control using the phase rotating circuit 122 and control of the oscillation frequency of the laser light source 11 in combination with each other. Specifically, the carrier-wave frequency control circuit 16 may use both the fine adjustment that controls the carrier-wave frequency of a light signal output from the IQ modulator 15A through controlling the cycle of the phase rotation that the phase rotating circuit 122 applies and rough adjustment that directly controls the frequency of the output light from the laser light source 11. The oscillation frequency of the laser light source 11 generally used in a wavelength multiplexed optical system is controllable by means of oscillation frequency adjustment based on changing an oscillation frequency grid and controlling the temperature. The carrier-wave frequency control circuit 16 accomplishes the above rough adjustment using oscillation frequency adjustment based on changing an oscillation frequency grid and controlling the temperature.

Likewise the optical transmitter 1 of FIG. 1, in the above optical transmitter 1A of the first embodiment, the carrier-wave frequency control circuit 16 outputs an amount $\Delta f_a$ of frequency control to the phase rotating circuit 122, so that the cycle of the phase rotation $\theta=2\pi\Delta f_a t$ that the phase rotating circuit 122 provides is controlled. This fine-adjusts the carrier-wave frequency of the light signal output from the IQ modulator 15A to a value of the sum of the frequency $f_C$ of the output light from the laser light source 11 and an amount $\Delta f_a$ of frequency control within the electric band of the optical transmitter 1A.

Accordingly, use of the amount $\Delta f_a$ of frequency control makes the optical transmitter 1A possible to control the carrier-wave frequency of the light signal output from the IQ modulator 15A more precisely and faster than the conventional method which directly controls the laser light source 11. This ensures the stability of the oscillation frequency of the laser light source 11, so that the transmission performance of an optical communication system using the optical transmitter 1A is improved. In addition, wavelength multiplexing intervals come to be dense to improve the rate of using the band of the transmission path (optical fiber) 3 and high-capacity transmission is realized.

In addition, differently from a conventional method that directly controls the laser light source 11, the optical transmitter 1A can carry out complex frequency control such as superimposing a pilot signal onto a carrier-wave frequency by means of frequency control, and superimposing dither for detecting quality of a received signal onto the carrier-wave frequency. This makes it possible to transmit a pilot signal (e.g., an error signal) without using a control channel, and to ensure various advantages, such as improvement in sensitivity of error detection at a receiver end with the aid of dither as detailed below with reference to FIGS. 10 and 11.

In addition, since the optical transmitter 1A of the first embodiment has functions of the I-channel predistortion compensating circuit 123I and the Q-channel predistortion compensating circuit 123Q, deterioration of signal quality caused by incompletion of the DACs 13I and 13Q, the drivers 14I and 14Q, and the phase modulators 151I and 151Q is compensated beforehand. This enables the optical transmitter 1A to accomplish high-quality light transmission.

Furthermore, since the carrier-wave frequency control circuit 16 concurrently uses the fine adjustment that controls the carrier-wave frequency by the phase rotating circuit 122 and rough adjustment to directly control the frequency of the output light from the laser light source 11, the optical transmitter 1A can precisely adjusts the carrier-wave frequency even beyond the electric band of the transmitter.

Figure 6:
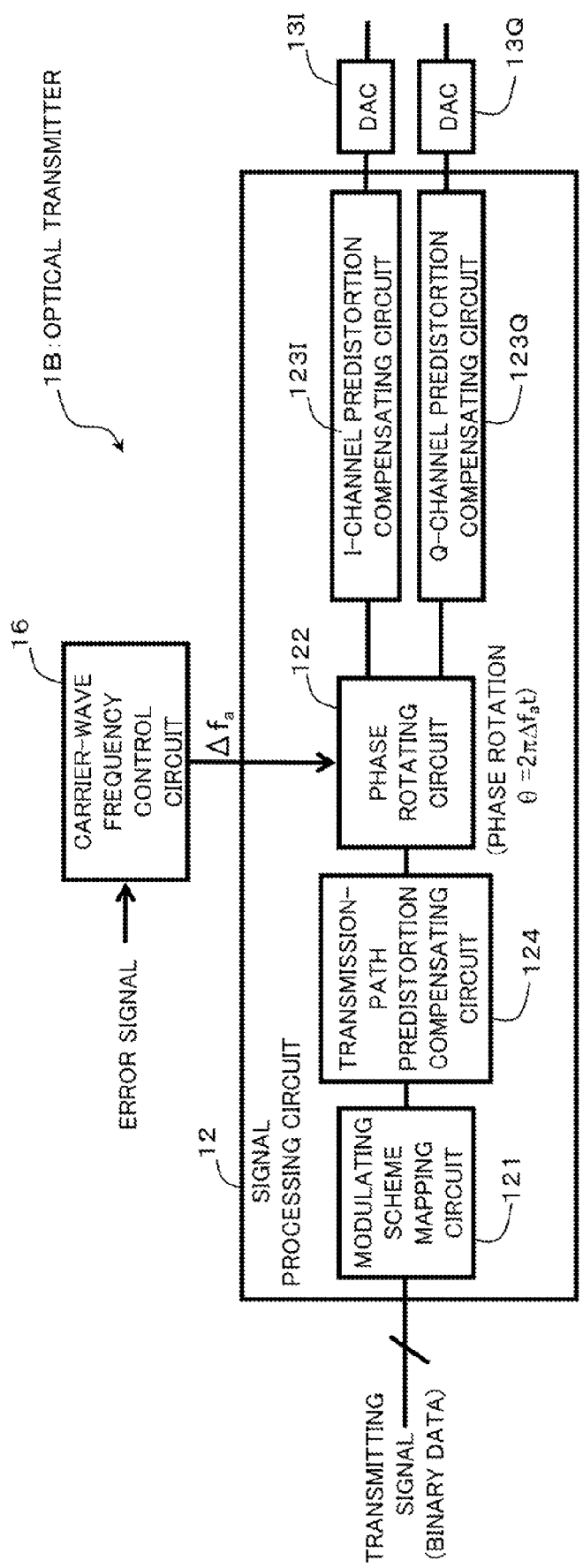
FIG. 6 is a block diagram schematically illustrating the configuration of an optical transmitter according to a second embodiment.

(3) Optical Transmitter of the Second Embodiment:

FIG. 6 is a block diagram schematically illustrating an optical transmitter 1B according to a second embodiment. The optical transmitter 1B of FIG. 6 is similar in configuration with the optical transmitter 1A except for the signal processing circuit 12 having a function of a transmission-path predistortion compensating circuit 124. FIG. 6 omits the laser light source 11, the drivers 14I and 14Q, and the IQ modulator 15A. In FIG. 6, parts and elements having the same reference numbers as the foregoing description represent the same or similar parts and elements, so repetitious description is omitted here.

The transmission-path predistortion compensating circuit 124 is arranged between the 121 and the phase rotating circuit 122, and compensates the electric-field information $E_1$, to which the modulating scheme mapping circuit 121 maps the transmission signal, for prospective deterioration in signal quality due to transmission through the transmission path (optical fiber) 3. As detailed below, the compensation is accomplished by multiplying (convolving) the electric-field information $E_1$ from the modulating scheme mapping circuit 121 by the reversed function of a waveform distortion due to the optical transmission through the transmission path 3.

Accordingly, the optical transmitter 1B of the second embodiment ensures the same effects as those of the optical transmitter 1A of the first embodiment. In addition, since the signal processing circuit 12 has a function of the transmission-path predistortion compensating circuit 124, the waveform distortion caused by optical transmission through the transmission path 3 can be compensated beforehand, so that the optical transmitter 1B of the second embodiment can attain higher-quality optical transmission.

Hereinafter, description will now be made in relation to the principle of the signal processing in the optical transmitter 1B of FIG. 6, that is, controlling the carrier-wave frequency by the phase rotating circuit 122 with reference to following Formulae (1) through (5).

As described above, the electric-field information $E_1$ after the mapping of the transmitting signal by the modulating scheme mapping circuit 121 is represented by Formula (1).

$$E_1 = A(t) \cdot \exp(j\theta(t)) \qquad (1)$$

where, the term "j" represents the imaginary unit; the term "A(t)" represents an electric-field intensity (amplitude); the term "θ(t)" represents an electric-field phase; and the term "t" represents time.

The electric-field information $E_2$ after the transmission-path predistortion compensating circuit 124 compensates for distortion of the electric-field information $E_1$ is expressed by following Formula (2).

$$E_2 = h_1(t) * E_1 \quad (2)$$

where, the symbol "*" represents calculation of convolving; the term "$h_1(t)$" represents the reversed function of waveform distortion of the transmission path 3.

Electric-field information $E_3$ obtained through the phase rotation based on the amount $\Delta f_a$ of frequency control on the electric-field information $E_2$ by the phase rotating circuit 122 is expressed following Formula (3)

$$E_3 = \exp(j2\pi\Delta f_a t) \cdot E_2 \quad (3)$$

Electric-field information $E_4$ obtained through compensation on the electric-field information $E_3$ by the I-channel predistortion compensating circuit 123I and the Q-channel predistortion compensating circuit 123Q is expressed following Formula (4).

$$E_4 = h_2(t) * E_3 \quad (4)$$

where, the term "$h_2(t)$" represents a reversed function of a waveform distortion of the optical transmitter 1B (transmitting system) of the second embodiment.

The intensity $P_{sig}$ of a signal obtained by processing on the electric-field information $E_4$ by the DACs 13I and 13Q, the drivers 14I and 14Q, and the phase modulators 151I and 151Q is expressed by following Formula (5)

$$\begin{aligned} P_{sig} &= P \cdot \exp(j2\pi(f_c)t) \cdot h_2(t)' * E_4 \\ &= P \cdot \exp(j2\pi(f_c)t) \cdot h_2(t)' * h_2(t) * E_3 \\ &= P \cdot \exp(j2\pi(f_c)t) \cdot E_3 \\ &= P \cdot \exp(j2\pi(f_c + \Delta f_a)t) \cdot E_2 \end{aligned} \quad (5)$$

where, the term "$f_c$" represents the frequency of output light that the laser light source 11 oscillates; the term "P" represents a photoelectric-field intensity; and the term "$h_2(t)'$" represents a function of the waveform distortion of the optical transmitter 1B (transmitting system) and establishes the relationship $h_2(t)' * h_2(t) = 1$.

(4) Optical Transmitter According to a Third Embodiment

Figure 7:
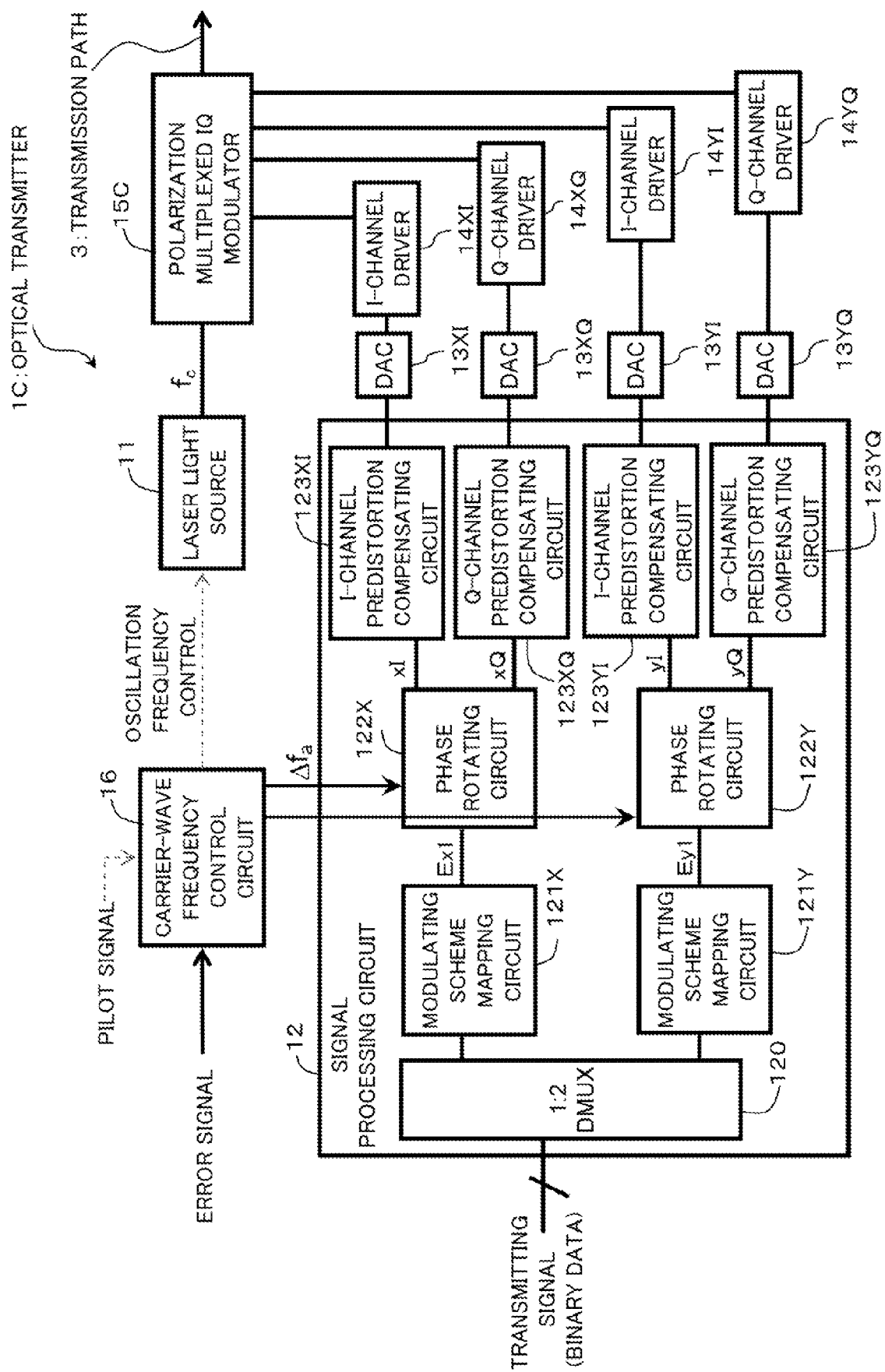
FIG. 7 is a block diagram schematically illustrating the configuration of an optical transmitter according to a third embodiment.

FIG. 7 is a block diagram schematically illustrating the configuration of the optical transmitter 1C according to the third embodiment. The optical transmitter 1C adopts a polarization multiplexing scheme, and includes the laser light source 11, the signal processing circuit 12, the DACs 13XI, 13XQ, 13YI, and 13YQ, the drivers 14XI, 14XQ, 14YI, and 14YQ, a polarization multiplexed IQ modulator 15C, and the carrier-wave frequency control circuit 16.

The laser light source 11 oscillates output light having a predetermined frequency $f_C$.

The signal processing circuit 12 carries out digital signal processing on a transmitting signal which is input from an external device and which is binary data, and has functions of a 1:2 DMUX 120, modulating scheme mapping circuits 121X and 121Y, the phase rotating circuits 122X and 122Y, the I-channel predistortion compensating circuits 123XI and 123YI, and the Q-channel predistortion compensating circuits 123XQ and 123YQ.

The 1:2 DMUX 120 serves as a divider that separates the transmitting signal in the form of binary data input from an external device into two branch signals corresponding one to each of polarization components X and Y orthogonal to each other.

The modulating scheme mapping circuits 121X and 121Y correspond to the polarization components X and Y separated by the 1:2 DMUX 120, respectively.

The modulating scheme mapping circuit 121X constellation-maps a signal of the polarization component X to electric-field information according to a modulation scheme such as QPSK, QAM, and OFDM. The electric-field information $E_{x1}$, to which the modulating scheme mapping circuit 121X maps the transmitting signal, includes an I component and a Q component, and is expressed by $Ex_1 = xI + j \cdot xQ$. Similarly, the modulating scheme mapping circuit 121Y constellation-maps a signal of the polarization component Y to electric-field information according to a modulation scheme such as QPSK, QAM, and OFDM. The electric-field information $Ey_1$, to which the modulating scheme mapping circuit 121Y maps the transmitting signal, includes an I component and a Q component, and is expressed by $Ey_1 = yI + j \cdot yQ$.

The phase rotating circuits 122X and 122Y are arranged downstream modulating scheme mapping circuits 121X and 121Y, respectively, and correspond to the polarization components X and Y, respectively.

The phase rotating circuit 122X applies phase rotation having a predetermined cycle to an electric-field phase of the electric-field information $Ex_1$, to which the modulating scheme mapping circuit 121X maps the transmitting signal. Specifically, likewise the optical transmitters 1 and 1A of FIGS. 1 and 2, the phase rotating circuit 122X applies, upon receipt of an amount $\Delta f_a$ of frequency control from the carrier-wave frequency control circuit 16, phase rotation $\theta = 2\pi\Delta f_a t$ to the electric-field phase of the electric-field information $Ex_1$. Similarly, the phase rotating circuit 122Y applies phase rotation having a predetermined cycle to an electric-field phase of the electric-field information $Ey_1$, to which the modulating scheme mapping circuit 121Y maps the transmitting signal. Specifically, the phase rotating circuit 122Y applies, upon receipt of an amount $\Delta f_a$ of frequency control from the carrier-wave frequency control circuit 16, phase rotation $\theta = 2\pi\Delta f_a t$ to the electric-field phase of the electric-field information $Ey_1$. The phase rotating circuits 122X and 122Y each have the same configuration as the phase rotating circuit 122 of FIG. 4.

The I-channel predistortion compensating circuit 123XI and the Q-channel predistortion compensating circuit 123XQ are arranged the downstream of the phase rotating circuit 122X and correspond to the polarization component X.

The I-channel predistortion compensating circuit 123XI compensates the I component of the electric-field information, to which the phase rotating circuit 122X provides the phase rotation, for prospective deterioration in signal quality of the I component of the polarization component X, which deterioration is caused by incompletion of a transmitting system corresponding to the I component of the polarization component X. Similarly, the Q-channel predistortion compensating circuit 123XQ compensates the Q component of the electric-field information, to which the phase rotating circuit 122X provides the phase rotation, for prospective deterioration in signal quality of the Q component of the polarization component X, which deterioration is caused by incompletion of a transmitting system corresponding to the Q component of the polarization component X. Here, an example of the transmitting system corresponding to the I component of the polarization component X includes the DAC 13XI, the driver 14XI, and a phase modulator 151XI that are to be detailed below; and an example of the transmitting system corresponding to the Q component of the polarization component X includes the DAC 13XQ, the driver 14XQ, and a phase modulator 151XQ that are to be detailed below. As detailed below, the compensation is accomplished by multiplying (convolving) the electric-field information from the phase rotating circuit 122X by the reversed function of a waveform distortion of the optical transmitter 1C (the transmitting system).

The I-channel predistortion compensating circuit 123YI and the Q-channel predistortion compensating circuit 123YQ are arranged the downstream of the phase rotating circuit 122Y and correspond to the polarization component Y.

The I-channel predistortion compensating circuit 123YI compensates the I component of the electric-field information, to which the phase rotating circuit 122Y provides the phase rotation, for prospective deterioration in signal quality of the I component the polarization component Y, which deterioration is caused by incompletion of a transmitting system corresponding to the I component of the polarization component Y. Similarly, the Q-channel predistortion compensating circuit 123YQ compensates the Q component of the electric-field information, to which the phase rotating circuit 122Y provides the phase rotation, for prospective deterioration in signal quality of the Q component of the polarization component Y, which deterioration is caused by incompletion of a transmitting system corresponding to the Q component of the polarization component Y. Here, an example of the transmitting system corresponding to the I component of the polarization component Y includes the DAC 13YI, the driver 14YI, and a phase modulator 151YI that are to be detailed below; and an example of the transmitting system corresponding to the Q component of the polarization component Y includes the DAC 13YQ, the driver 14YQ, and a phase modulator 151YQ that are to be detailed below. As detailed below, the compensation is accomplished by multiplying (convolving) the electric-field information from the phase rotating circuit 122Y by the reversed function of a waveform distortion of the optical transmitter 1C (the transmitting system).

The DACs 13XI and 13XQ correspond to the polarization component X, and convert digital signals (I component and Q component) from the I-channel predistortion compensating circuit 123XI and the Q-channel predistortion compensating circuit 123XQ, respectively, into analog signals. Similarly, the DACs 13YI and 13YQ correspond to the polarization component Y, and convert digital signals (I component and Q component) from the I-channel predistortion compensating circuit 123YI and the Q-channel predistortion compensating circuit 123YQ, respectively, into analog signals.

The divers 14XI and 14XQ correspond to the polarization component X, and amplify signals from the DACs 13XI and 13XQ and drive the respective corresponding phase modulator 151XI and 151XQ (see FIG. 8) in the polarization multiplexed IQ modulator 15C using the respective amplified signals. Similarly, the divers 14YI and 14YQ correspond to the polarization component Y, and amplify signals from the DACs 13YI and 13YQ and drive the respective corresponding phase modulator 151YI and 151YQ (see FIG. 8) in the polarization multiplexed IQ modulator 15C using the respective amplified signals.

The polarization multiplexed IQ modulator (optical modulator) 15C is a polarization multiplexed modulator that modulates the polarization component X and Y, which are orthogonal each other, independently of each other. The polarization multiplexed IQ modulator 15C modulates the output light from the laser light source 11 in accordance with the I component and Q component of two branch signals (polarization components X and Y) subjected to digital processing in the signal processing circuit 12, and outputs the modulated light, regarded as a light signal, to the transmission path 3.

Figure 8:
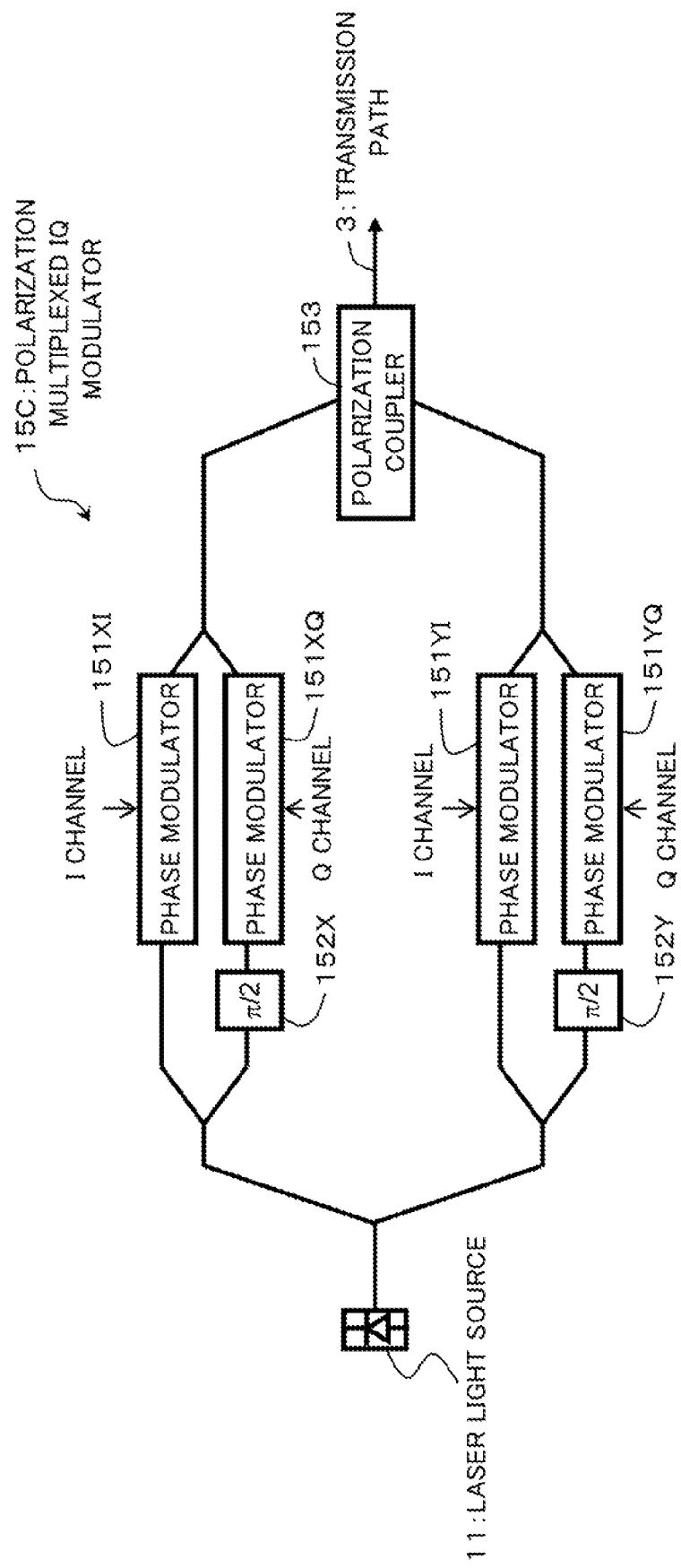
FIG. 8 is a block diagram schematically illustrating the configuration of a polarization multiplexing IQ modulator.

As illustrated in FIG. 8 that illustrates the configuration of the polarization multiplexed IQ modulator 15C, the polarization multiplexed IQ modulator 15C includes the phase modulator 151XI for the I component, the phase modulator 151XQ for the Q component, and a phase shifter 152X that deal with the polarization component X; and the phase modulator 151YI for the I component, the phase modulator 151YQ for the Q component, and a phase shifter 152Y that deal with the polarization component Y; and a polarization coupler 153. It is to be noted that FIG. 8 is a block diagram schematically illustrating the configuration of the polarization multiplexed IQ modulator 15C.

The phase shifter 152X provides a predetermined phase difference (e.g., $\pi/2$) between a pair of light signals propagating through the phase modulator 151XI and the phase modulator 151XQ, and is disposed on the side of the phase modulator 151XQ. The phase modulator 151XI and the phase modulator 151XQ perform phase modulation based on the transmitting signals (I component and Q component) from the drivers 14XI and 14XQ on the pair of light signals to which the predetermined phase difference is provided.

The phase shifter 152Y provides a predetermined phase difference (e.g., $\pi/2$) between a pair of light signals propagating through the phase modulator 151YI and the phase modulator 151YQ, and is disposed on the side of the phase modulator 151YQ. The phase modulator 151YI and the phase modulator 151YQ perform phase modulation based on the transmitting signals (I component and Q component) from the drivers 14YI and 14YQ on the pair of light signals to which the predetermined phase difference is provided.

The Polarization Beam Combiner (PCB) 153 combines the modulated signal of the polarization component X from the phase modulators 151XI and 151XQ and the modulated signal of the polarization component Y from the phase modulators 151YI and 151YQ, and outputs the combined signal to the transmission path 3.

Similarly to the optical transmitters 1, 1A, and 1B, the carrier-wave frequency control circuit 16 controls the carrier-wave frequency of the light signal (X polarization and Y polarization) output from the polarization multiplexed IQ modulator 15C. The carrier-wave frequency control circuit 16 outputs an mount $\Delta f_a$ of frequency control to the phase rotating circuits 122X and 122Y to control the cycles of the phase rotation $\theta = 2\pi \Delta f_a t$ that the phase rotating circuits 122X and 122Y apply, so that the carrier-wave frequency of the light signal (X polarization and Y polarization) output from the polarization multiplexed IQ modulator 15C can be controlled. As a result of the above frequency control, the carrier-wave frequency control circuit 16 fine-adjusts the carrier-wave frequency of the light signal (X polarization and Y polarization) output from the polarization multiplexed IQ modulator 15C within the electric band of the optical transmitter 1C. The electric band of the optical transmitter 1C depends on the band properties of the DACs 13XI, 13XQ, 13YI, and 13YQ, the drivers 14XI, 14XQ, 14YI, and 14YQ, and the polarization multiplexed IQ modulator 15C.

Similarly to the first embodiment, the carrier-wave frequency control circuit 16 fine-adjusts the frequency of the carrier wave within the electric band of the optical transmitter 1C by adjusting the rotating frequencies that the phase rotating circuits 122X and 122Y apply in accordance with an error signal from an optical receiver 2A or 2B (see FIGS. 9-11) in communication with the optical transmitter 1C, so that the error at the receiver end is resolved.

Alternatively, the carrier-wave frequency control circuit 16 may superimpose a result (i.e., the above error signal) of detecting a quality of a pilot signal exemplified by a received signal onto the carrier-wave frequency of the light signal (X polarization and Y polarization) output from the polarization multiplexed IQ modulator 15C through frequency modulation similarly to the first embodiment. In the optical transmitter 1C of FIG. 7, the carrier-wave frequency control circuit 16 outputs the same amount $\Delta f_a$ and $\Delta f_b$ of frequency control to the phase rotating circuits 122X and 122Y. Alternatively, different amounts $\Delta f_a$ of frequency control may be provided to the phase rotating circuits 122X and 122Y.

Similarly to the first embodiment, the carrier-wave frequency control circuit 16 may superimpose dither for detecting quality of a received signal onto the carrier-wave frequency of a light signal (X polarization and Y polarization) that the polarization multiplexed IQ modulator 15C outputs by controlling the cycles of the phase rotations $\theta=2\pi\Delta f_a t$ that the phase rotating circuits 122X and 122Y apply to control the carrier-wave frequency of a light signal (X polarization and Y polarization) that the polarization multiplexed IQ modulator 15C outputs, and transmit the superimposed dither to the receiver end (the optical receiver 2A or 2B) through the transmission path 3.

Similarly to the first embodiment, when the carrier-wave frequency is to be adjusted beyond the electric band of the transmitter, the carrier-wave frequency control circuit 16 may carry out control using the phase rotating circuits 122X and 122Y and control of the oscillation frequency of the laser light source 11 in combination with each other. Specifically, the carrier-wave frequency control circuit 16 uses both the fine adjustment that controls the carrier-wave frequency of a light signal (X polarization and Y polarization) output from the polarization multiplexed IQ modulator 15C through controlling the cycles of the phase rotations that the phase rotating circuits 122X and 122Y apply, and rough adjustment that directly controls the frequency of the output light from the laser light source 11, so that the carrier-wave frequency of a light signal output from the polarization multiplexed IQ modulator 15C can be controlled.

Likewise the optical transmitter 1 of FIG. 1, in the above optical transmitter 1C of the third embodiment, the carrier-wave frequency control circuit 16 outputs an amount $\Delta f_a$ of frequency control to the phase rotating circuits 122X and 122Y, so that the cycle of the phase rotation $\theta=2\pi\Delta f_a t$ that the phase rotating circuits 122X and 122Y apply is controlled. This fine-adjusts the carrier-wave frequency of the light signal (X polarization and Y polarization) output from the polarization multiplexed IQ modulator 15C to a value of the sum of the frequency $f_C$ of the output light from the laser light source 11 and an amount $\Delta f_a$ of frequency control in the electric band of the optical transmitter 1C.

Accordingly, use of the amount $\Delta f_a$ of frequency control makes the optical transmitter 1C possible to control the carrier-wave frequency of the light signal output from the polarization multiplexed IQ modulator 15C more precisely and faster than the conventional method which directly controls the laser light source 11, similarly to the optical transmitter 1A of the first embodiment. This ensures the stability of the oscillation frequency of the laser light source 11, so that the transmission performance of an optical communication system using the optical transmitter 1C is improved. In addition, wavelength multiplexing intervals come to be dense to improve the rate of using the band of the transmission path (optical fiber) 3, and high-capacity transmission is realized.

In particular, the optical transmitter 1C, which adopts the polarization multiplexing scheme, can double the bit-rate per baud rate in the optical communication system.

In addition, differently from a conventional method that directly controls the laser light source 11, also the optical transmitter 1C can carry out complex frequency control such as superimposing a pilot signal onto a carrier-wave frequency by means of frequency control, superimposing dither for detecting quality of a received signal onto the carrier-wave frequency. This makes it possible to transmit a pilot signal (e.g., an error signal) without using a control channel, and to ensure various advantages, such as improvement in sensitivity of error detection at the receiver end with the aid of dither as detailed below with reference to FIGS. 10 and 11.

Besides, the optical transmitter 1C of the third embodiment, the carrier-wave frequency control circuit 16 may output different amounts $\Delta f_a$ and $\Delta f_b$ of frequency control to the phase rotating circuits 122X and 122Y, as described above. Thereby, different pilot signals can be superimposed onto the polarization components X and Y through frequency modulation, so that an amount information to be transmitted by the pilot signals can be doubled.

Also in the optical transmitter 1C, since the signal processing circuit 12 has functions of the I-channel predistortion compensating circuits 123XI and 123YI, and the Q-channel predistortion compensating circuit 123XQ and 123YQ, it is possible to compensate for distortion of signal quality due to incompletion of the DACs 13XI, 13XQ, 13YI, and 13YQ; the drivers 14XI, 14XQ, 14YI, and 14YQ, and the phase modulators 151XI, 151XQ, 151YI, and 151YQ beforehand. This enables the optical transmitter 1C to accomplish high-quality light transmission.

Furthermore, since the carrier-wave frequency control circuit 16 uses both the fine adjustment that controls the carrier-wave frequency by the phase rotating circuits 122X and 122Y and rough adjustment that directly controls the oscillation frequency of the output light from the laser light source 11, the optical transmitter 1C can precisely adjusts the carrier-wave frequency even beyond the electric band of the transmitter.

Also in the optical transmitter 1C, transmission-path predistortion compensating circuits being the same as the transmission-path predistortion compensating circuit 124 of the optical transmitter 1B illustrated in FIG. 6 may be disposed between the modulating scheme mapping circuit 121X and the phase rotating circuit 122X and between the modulating scheme mapping circuit 121Y and the phase rotating circuit 122Y. The transmission-path predistortion compensating circuits compensate the electric-field information, to which the modulating scheme mapping circuit 121X or 121Y maps the transmitting signal, for deterioration in signal quality, which deterioration is caused when transmission through the transmission path 3. This configuration compensates for distortion in waveform caused by optical transmission through the transmission path 3 beforehand, and higher-quality light transmission can be realized.

The signal processing in the optical transmitter 1C, which adopts a polarization multiplexing scheme, is carried out along Formulae (1) through (5) described above for the signal processing in the second embodiment. It should be noted that, when a polarization multiplexing scheme is adopted, the electric-field information E in Formula (1) through (5) uses $E_x$ and $E_y$ serving as information of X polarization and Y polarization as taught in following Formula (6), and the function and the reversed function $h(=h_1(t), h_2(t)$ or $h_2(t)')$ related to distortion in waveform is replaced with the following function considering polarization as Formula (7) below.

$$E = \begin{bmatrix} E_x \\ E_y \end{bmatrix} \quad (6)$$

$$h = \begin{bmatrix} h_{xx} & h_{yx} \\ h_{xy} & h_{yy} \end{bmatrix} \quad (7)$$

Figure 9:
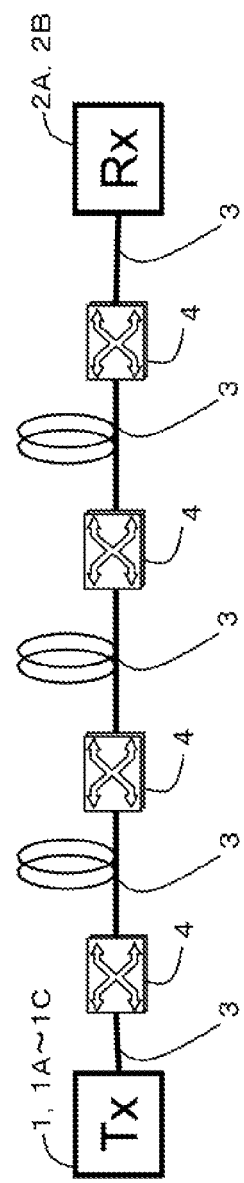
FIG. 9 is a block diagram schematically illustrating the configuration of an optical communication system.
Figure 10:
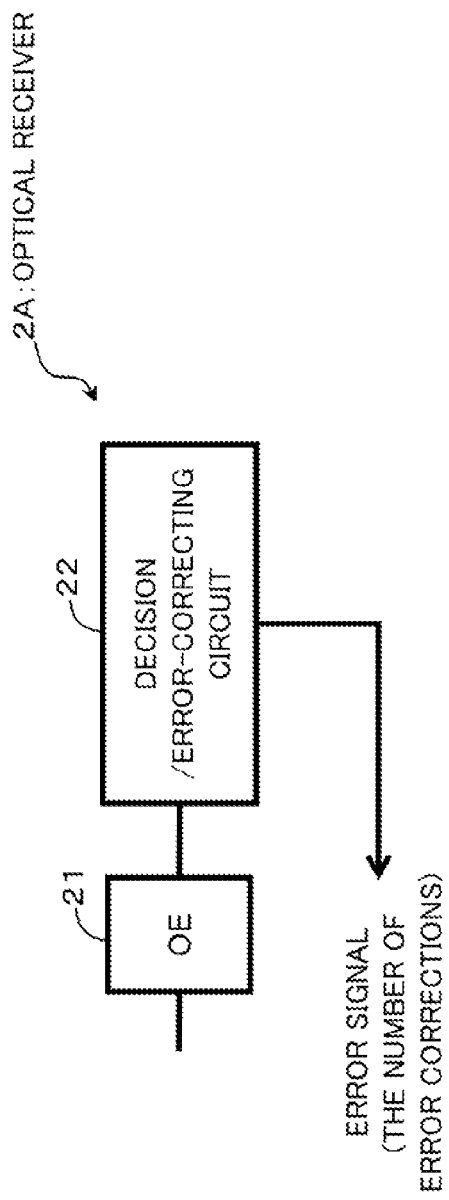
FIG. 10 is a block diagram schematically illustrating the configuration of an example of an optical receiver.
Figure 11:
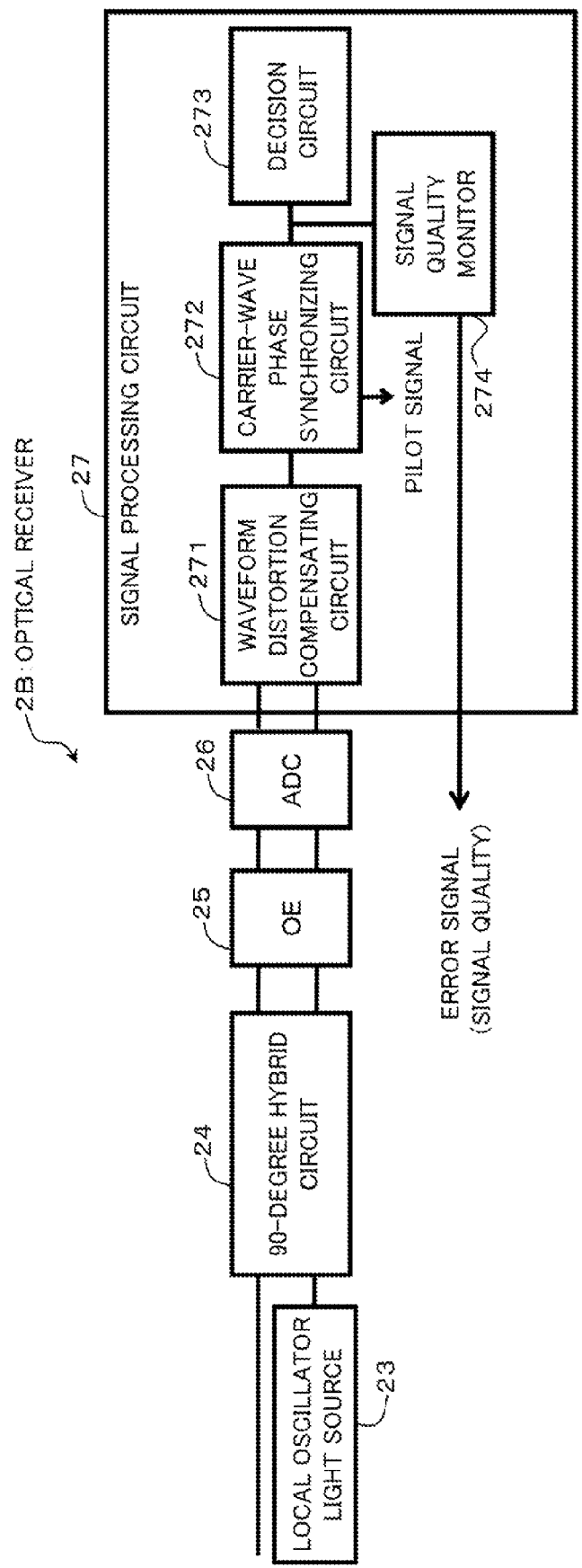
FIG. 11 is a block diagram schematically illustrating the configuration of another example of an optical receiver.

(5) Optical Communication System and Optical Receiver:

Next, referring to FIG. 9, description will now be made in relation to an optical communication system adopting the above optical transmitters 1, and 1A through 1C, and referring to FIGS. 10 and 11, description will now be made in relation to the configuration of the optical receivers 2A and 2B that the optical communication system adopts. FIG. 9 is a block diagram schematically illustrating the configuration of the optical communication system of this embodiment; FIG. 10 is a block diagram schematically illustrating the configuration of the optical receiver 2A; and FIG. 11 is a block diagram schematically illustrating the configuration of the optical receiver 2B.

As illustrated in FIG. 9, the optical communication system adopting the optical transmitters 1, and 1A through 1C includes an optical transmitter Tx, an optical receiver Rx, the transmission path 3, and a number (four in FIG. 9) of repeaters 4. Here, the optical transmitter Tx is one of the above optical transmitters 1, and 1A through 1C, and the optical receiver Rx is the optical receiver 2A or 2B that are to be detailed below with reference to FIGS. 10 and 11. The transmission path 3 (optical fiber) connects the optical transmitter Tx and the optical receiver Rx, which are interposed by two or more repeaters 4.

As illustrated in FIG. 10, the optical receiver (an example of the optical receiver) 2A includes an OE 21 and a decision/error-correcting circuit 22.

The OE (optical/electric converting circuit) 21 receives a light signal that the optical transmitter Tx outputs through the transmission path 3, and converts the light signal into an electric signal.

The decision/error-correcting circuit 22 recognizes the electric signal from the OE 21, and monitors the number of error corrections of the electric signal.

The number of error corrections monitored by the decision/error-correcting circuit 22 is regarded as an error signal described above, which is transmitted from the optical receiver Rx (2A) to the optical transmitter through a reverse-direction channel, through the control channel of the optical communication system, regarding the error signal as a pilot signal, or through the use of the above frequency modulation. In the optical transmitter Tx, which receives the number of error corrections from the optical receiver Rx (2A) in the above manner, the carrier-wave frequency control circuit 16 adjusts the rotation frequencies of the phase rotating circuits 122, 122X, and 122Y such that the number of error corrections is minimized for fine-adjustment of the carrier-wave frequency within the electric band of the optical receiver Tx.

As illustrated in FIG. 11, the optical receiver (another example of the optical receiver, a digital coherent receiver) 2B includes a local oscillator light source 23, a 90-degree hybrid circuit 24, an OE 25, an ADC 26, and a signal processing circuit 27.

The local oscillator light source 23 oscillates local oscillation light, and outputs the oscillated light.

The 90-degree hybrid circuit 24 combines the local oscillated light from the local oscillator light source 23 and the light signal that the optical transmitter Tx transmit through the transmission path 3, and outputs two pairs of light signals having light phases having a phase shift of 90 degrees.

The OE (optical/electric converting circuit) 25 converts the two pairs of light signals from the 90-degree hybrid circuit 24 into electric signals.

The ADC (analog/digital converting circuit) 26 converts the electric signals from the OE 25 into digital signals.

The signal processing circuit 27 carries out the digital signal processing on the two pairs of digital signals from the ADC 26, and has functions of a waveform distortion compensating circuit 271, a carrier-wave phase synchronizing circuit 272, a decision circuit 273, and the signal quality monitor 274.

The waveform distortion compensating circuit 271 compensates for distortion in waveform of the digital signal from the ADC 26.

The carrier-wave phase synchronizing circuit 272 has a function of compensating for a frequency difference (offset) and phase difference between the received optical signal and the local oscillator light-source (see, J. C. Rasmussen et al., "Digital Coherent Receive Technology for 100-Gps Optical Transport System", FUJITSU, vol. 60, no. 5, p. 476-483, September, 2009); and demodulating a frequency.

The function of compensating for a frequency difference (offset) and phase difference between the received optical signal and the local oscillator light-source carries out compensation for the frequency difference (offset) and phase difference on the digital signal whose distortion in waveform is compensated by the waveform distortion compensating circuit 271. There is a possibility of occurring a frequency offset in the range of a wavelength accuracy between the laser light source 11 in the optical transmitter Tx and the local oscillator light source 23 of the light receiver 2B. An ordinary light source for wavelength multiplexing may have a frequency offset as large as several GHz at maximum. A large frequency offset makes it difficult to demodulate a received signal. Therefore, the function of compensating for frequency offset obtains an estimated value of a frequency offset, feeds back the estimated value based on which the oscillation frequency of the local oscillator light source 23 is fine-adjusted or compensated for through digital processing, so that the frequency offset is compensated for.

A phase difference between the laser light source 11 of the optical transmitter Tx and the local oscillator light source 23 of the optical receiver 2B is left after the compensation for the frequency offset between the laser light source 11 and the local oscillator light source 23. The function of estimating the phase of a carrier estimates the phase difference of the carrier wave and compensates for the phase difference in order to prepare for data decision.

The function of demodulating a frequency demodulates, when the pilot signal is superimposed through the above frequency modulation in the optical transmitter Tx, the pilot signal from the carrier wave. Consequently, the carrier-wave phase synchronizing circuit 272 can obtain an estimated value of the frequency offset through the function of compensating for a frequency offset, so that the offset value of the light-source frequency can demodulate a pilot signal superimposed through the frequency modulation by the optical transmitter Tx.

The decision circuit 273 carries out data decision on a received signal on the basis of the signal obtained by the carrier-wave phase synchronizing circuit 272, and outputs the result of the decision as a data signal.

The signal quality monitor 274 monitors the quality of a signal obtained by the carrier-wave phase synchronizing circuit 272.

The signal quality monitored by the signal quality monitor 274 is regarded as the above error signal, which is transmitted from the optical transmitter Rx (2B) to the optical transmitter Tx through a reverse-direction channel, through the control channel of the optical communication system, regarding the error signal as a pilot signal, or through the use of the frequency modulation. In the optical transmitter Tx, which receives the signal quality from the optical receiver Rx (2B) adjusts the rotation frequency of the phase rotating circuits 122, 122X, and 122Y such that the signal quality comes to the best and fine-adjusts the carrier-wave frequency within the electric band of the optical transmitter Tx.

In order to easily find the optimum carrier-wave frequency, it is effective to transmit a signal obtained by superimposing a dither onto a carrier-wave frequency by the carrier-wave frequency control circuit 16. In this case, the dither superimposed to the carrier-wave frequency is monitored on the basis of the number of error corrections obtained by the decision/error-correcting circuit 22 or of the quality information obtained by the signal quality monitor 274. Then, the carrier-wave frequency control circuit 16 adjusts the rotation frequency of the phase rotating circuits 122, 122X, and 122Y such that the amplitude of the dither monitored comes to be the minimum, and fine-adjusts the carrier-wave frequency within the electric band of the optical transmitter Tx. Concurrently, the amplitude of the monitored dither is regarded as the error signal, which is transmitted from the optical receiver Rx to the optical transmitter Tx.

Using of the optical transmitters 1,1A through 1C in combination with the optical receivers 2A and 2B, the carrier wave frequency can be precisely controlled at a high-speed such that the number of error corrections of a received signal is minimized, that the quality of a received signal is best, or that the dither amplitude is minimized.

(6) First Example of an Optical Transmitter Unit:

Hereinafter, a description will now be made in relation to examples (first through fifth example) of an optical communication unit that accomplishes high-density wavelength multiplexing using the optical transmitters 1, 1A through 1C having the above configuration.

Figure 12:
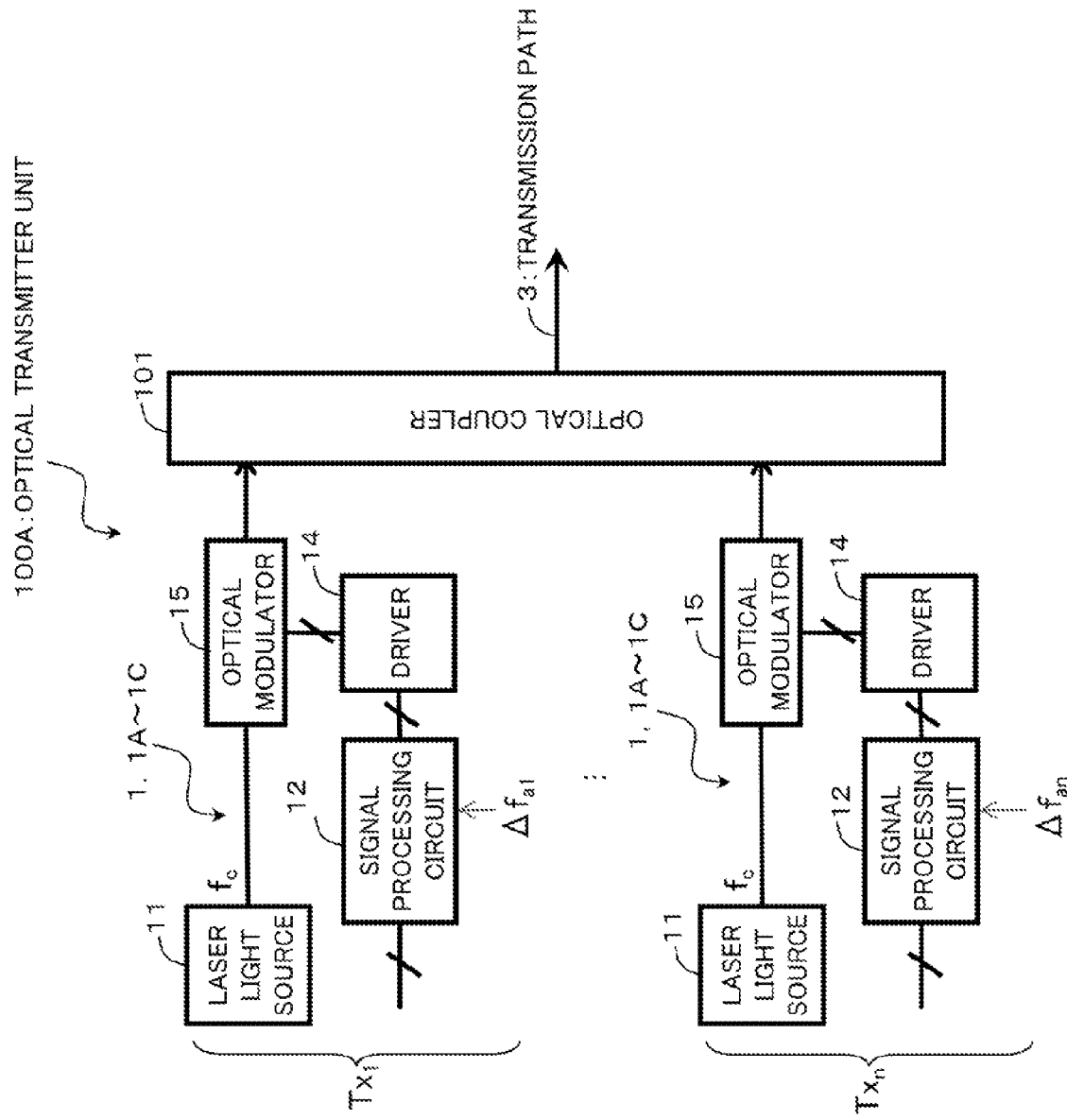
FIG. 12 is a block diagram schematically illustrating the configuration of an optical transmitter unit according to a first example.
Figure 13:
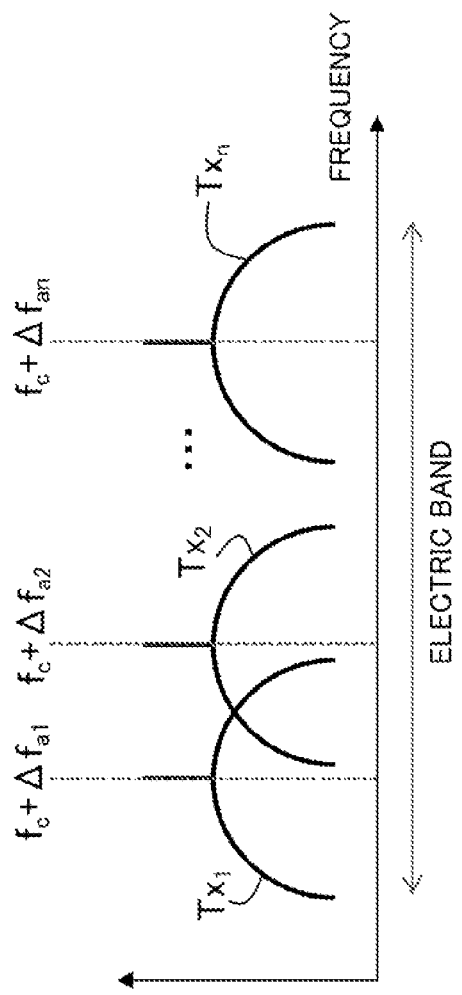
FIG. 13 is a diagram illustrating a transmitting spectrum of an optical transmitter unit of FIG. 12.

To begin with, an optical transmitter unit according to the first example will now be described with reference to FIGS. 12 and 13. FIG. 12 is a block diagram illustrating the configuration of an optical transmitter unit of the first example; and FIG. 13 is a diagram illustrating a transmission spectrum of the optical transmitter unit of FIG. 12.

As illustrated in FIG. 12, the optical transmitter unit 100A of the first example includes a number (n in FIG. 12, where n is a natural number) of optical transmitters $Tx_1$ through $Tx_n$ and an optical coupler 101. The optical transmitters $Tx_1$ through $Tx_n$ are the same one of the optical transmitters 1, 1A through 1C illustrated in FIGS. 1-8. The optical transmitters $Tx_1$ through $Tx_n$ in FIG. 12 is the optical transmitter 1 illustrated in FIG. 1, and FIG. 12 omits the DAC 13 and the carrier-wave frequency control circuit 16.

The optical coupler 101 combines light signals from optical transmitters $Tx_1$ through $Tx_n$ for wavelength multiplexing and outputs the wavelength multiplexed signal to the transmission path 3.

The respective laser light sources 11 of the optical transmitters $Tx_1$ through $Tx_n$ oscillate output light having the same frequency $f_c$.

The respective carrier-wave frequency control circuits 16 of the optical transmitters $Tx_1$ through $Tx_n$ fine-adjust the carrier-wave frequency of light signals output from the optical modulators 15, 15A, or 15C by controlling the cycles of the phase rotations that the phase rotating circuits 122, 122X, or 122Y apply.

The respective carrier-wave frequency control circuits 16 of the optical transmitters $Tx_1$ through $Tx_n$ output different amounts $\Delta f_{a1}$ through $\Delta f_{an}$ of frequency control to the phase rotating circuits 122, 122X, or 122Y. As illustrated in FIG. 13, the center frequencies of the carrier waves output from the optical modulators 15, 15A, or 15C of the optical transmitters $Tx_1$ through $Tx_n$ are adjusted to $f_C+\Delta f_{a1}$, $f_C+\Delta f_{a2}$, ..., $f_C+\Delta f_{an}$ in the electric bandwidth.

According to the optical transmitter unit 100A of the first example, use of the functions of the respective carrier-wave frequency control circuits 16 of the optical transmitters $Tx_1$ through $Tx_n$ can precisely adjust the carrier-wave frequencies of the light signals output from the $Tx_1$ through $Tx_n$ within the electric bandwidth at a high speed. Thereby, the intervals of wavelength multiplexing come to be highly dense to improve the using rate of the band of the transmission path (optical fiber) 3, so that high-capacity transmission can be realized.

A single laser light source 11 may be shared by the optical transmitters $Tx_1$ through $Tx_n$, which makes it possible to further simplify the configuration of the optical transmitter unit 100A.

Figure 14:
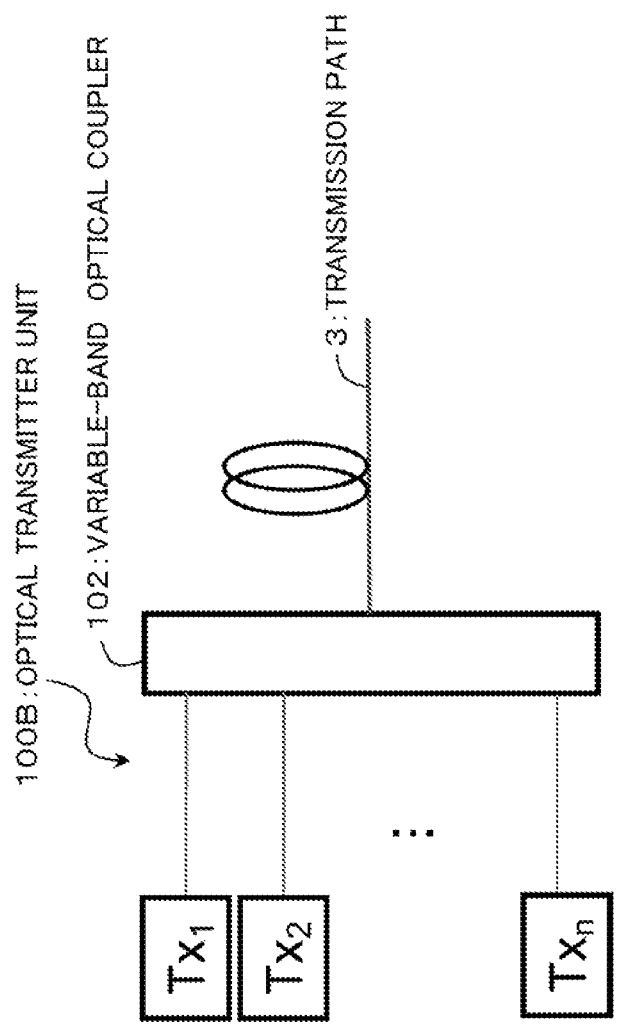
FIG. 14 is a block diagram schematically illustrating the configuration of an optical transmitter unit according to a second example.
Figure 15:
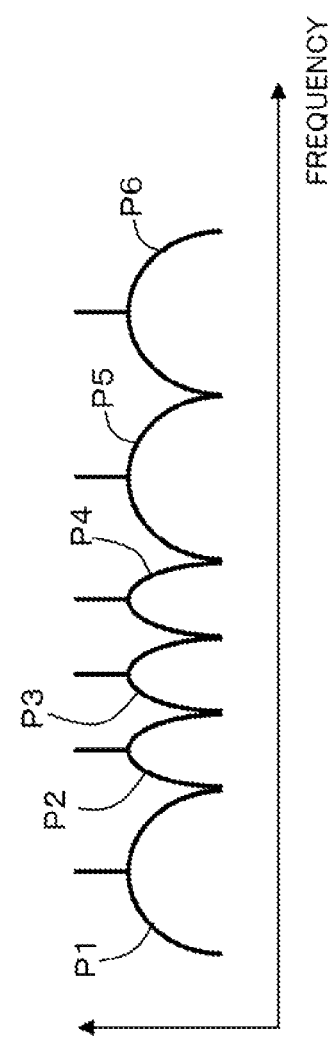
FIG. 15 is a diagram illustrating a transmitting spectrum of an optical transmitter unit of FIG. 14.
Figure 16:
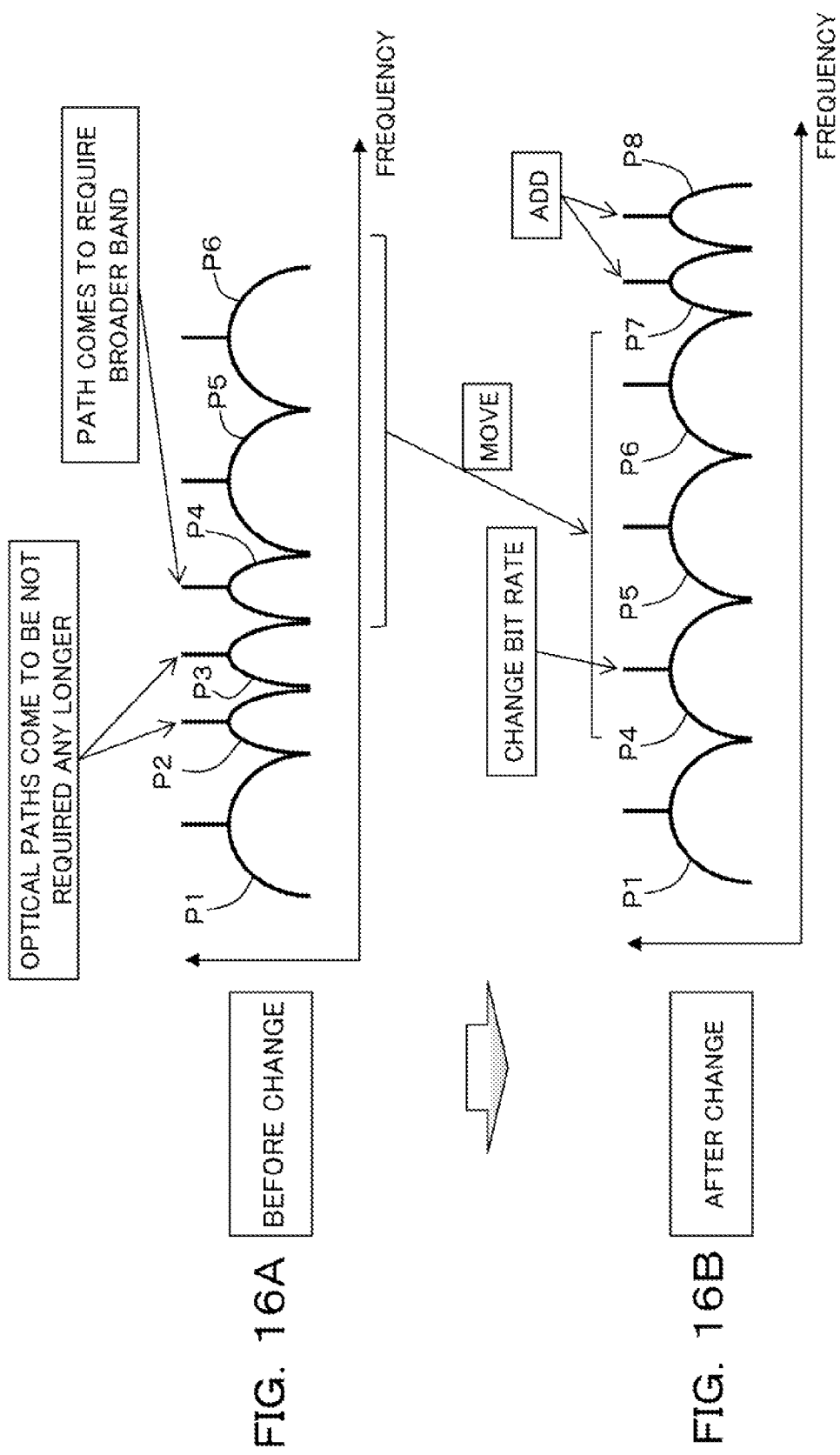
FIGS. 16A and 16B are diagrams illustrating wavelength-arrangement change (defragmentation) of an optical transmitter unit of FIG. 14.

(7) Second Example of the Optical Transmitter Unit:

The optical transmitter unit according to a second example will now be described with reference to FIGS. 14 through 16B. FIG. 14 is a block diagram illustrating the configuration of an optical transmitter unit of the second example; FIG. 15 is a diagram illustrating a transmission spectrum of the optical transmitter unit of FIG. 14; and FIGS. 16A and 16B are diagrams explaining wavelength arrangement change (defragmentation) of the optical transmitter unit of FIG. 14.

As illustrated in FIG. 14, the optical transmitter unit 100B of the second example includes a number (n in FIG. 14) of optical transmitters $Tx_1$ through $Tx_n$, and a variable-band optical coupler 102.

The optical transmitters $Tx_1$ through $Tx_n$ are the same one of the optical transmitters 1, 1A through 1C illustrated in FIGS. 1-8.

The variable-band optical coupler 102 combines light signals from the optical transmitters $Tx_1$ through $Tx_n$ for wavelength multiplexing and outputs the wavelength multiplexed signal to the transmission path 3, and can vary the band.

In the optical transmitter unit 100B of the second example, the respective carrier-wave frequency control circuits 16 of optical transmitters $Tx_1$ through $Tx_n$ control the cycles of the phase rotations that phase rotating circuit 122 applies, so that wavelength arrangement can be adjusted in accordance with the bit rate of the transmitting signal (binary data).

Accordingly, when signals having different bit rates are to be transmitted through a single optical fiber, the functions of the carrier-wave frequency control circuits 16 of the optical transmitters $Tx_1$ through $Tx_n$ precisely fine-adjust the arrangement of wavelengths corresponding to the bit rates of optical path P1 through P6 (i.e., the transmitting signal from the optical transmitters $Tx_1$ through $Tx_n$) at high speed as illustrated in FIG. 15. Thereby, the intervals of wavelength multiplexing come to be highly dense to improve the using rate of the band of the transmission path (optical fiber) 3, so that high-capacity transmission can be realized.

At that time, the carrier-wave frequency control circuits 16 of the optical transmitters $Tx_1$ through $Tx_n$ may adjust the wavelength arrangement by using both the above fine adjustment function and a rough adjustment function that directly controls the frequency of the output light from the laser light source 11. As detailed above, the rough adjustment is accomplished by adjusting the oscillation frequency by means of changing the oscillation frequency grid or controlling the temperature. Such a combination of the fine adjustment and rough adjustment can precisely adjust the carrier-wave frequency within a large width exceeding the electric band of the optical transmitters.

Here, after an optical network having high-dense wavelength arrangement as illustrated in FIGS. 15 and 16A are practically used for years, demands and requests of the respective optical paths may be changed. In this case, correction and change of the wavelength arrangement of the optical network can improve the using efficiency of wavelength resources.

In the optical transmitter unit 100B of the second example can correct and change the wavelength arrangement of the optical network using the above fine and rough adjustment functions. If an optical path is moved and changed within at least the electric band, the use of the fine adjustment of the carrier-wave frequency control circuits 16 can precisely change the wavelength arrangement hitlessly (that is, without disconnection of the optical path) at a high speed.

For example, in an optical network being in a state of wavelength arrangement of optical paths P1 through P6 as illustrated in FIG. 16A, the optical paths P2 and P3 come to be not required any longer while the optical path P4 comes to require a broader band. In this case, as illustrated in FIG. 16B, for example, after the bit rate of the optical path P4 is changed, the optical paths P4 through P6 are moved by the above fine and rough adjustment functions, so that the optical paths P1, P4 through P6 are high-densely arranged. In addition, in the example of FIG. 16B, new optical paths P7 and P8 are added in a frequency band subsequent to the optical path P6 and high-densely arranged by the above fine and rough adjustment functions.

According to the optical transmitter unit 100B of the second example, the fine and rough adjustment functions of the respective carrier-wave frequency control circuits 16 of the optical transmitters $Tx_1$ through $Tx_n$ precisely change the wavelength arrangement at a high speed. Even if the demand and the requirement of each optical path changes after a long-term operation of the optical network, the wavelength arrangement of the optical network is corrected and changed, so that the using rate of wavelength resource can be improved.

Figure 17:
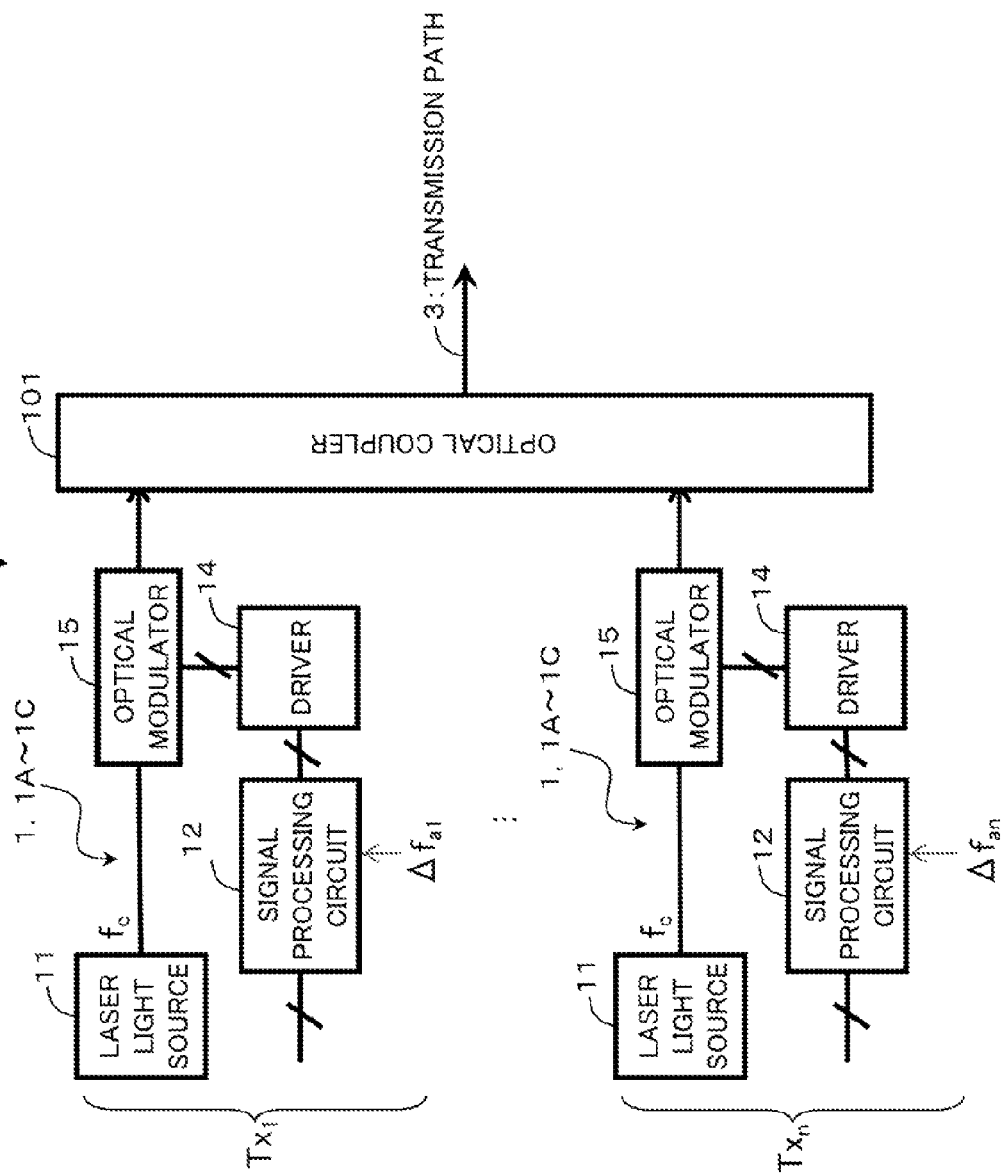
FIG. 17 is a block diagram schematically illustrating the configuration of an optical transmitter unit according to a third example.
Figure 18:
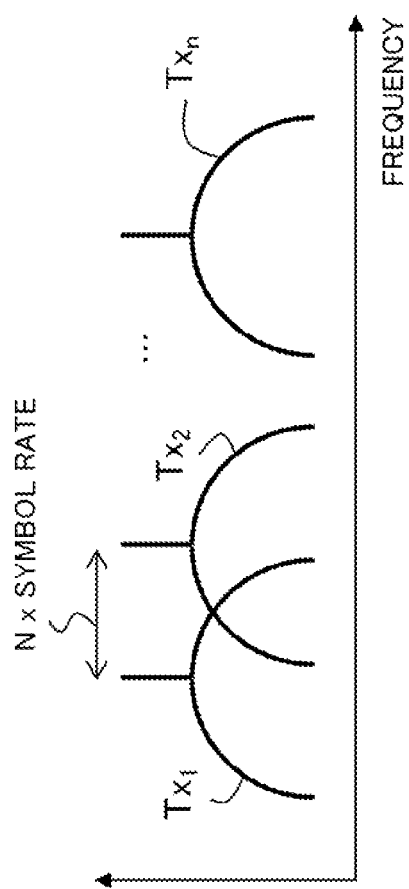
FIG. 18 is a diagram illustrating a transmitting spectrum of an optical transmitter unit of FIG. 17.

(8) Third Example of an Optical Transmitter Unit:

A description will now be made in relation to an optical transmitter unit according to a third example with reference to FIGS. 17 and 18. FIG. 17 is a block diagram schematically illustrating an optical transmitter unit of the third example; and FIG. 18 is a diagram illustrating a transmitting spectrum of the optical transmitter unit of FIG. 17.

As illustrated in FIG. 17, an optical transmitter unit 100C of the third example includes a number (n in FIG. 17) of optical transmitters $Tx_1$ through $Tx_n$ and an optical coupler 101, similarly to the optical transmitter unit 100A of the first example illustrated in FIG. 12.

The optical transmitters $Tx_1$ through $Tx_n$ are the same one of the optical transmitters 1, 1A through 1C illustrated in FIGS. 1-8. The optical transmitters $Tx_1$ through $Tx_n$ in FIG. 17 is the optical transmitter 1 illustrated in FIG. 1 likewise FIG. 12, and FIG. 17 omits the DAC 13 and the carrier-wave frequency control circuit 16.

The optical coupler 101 combines light signals from optical transmitters $Tx_1$ through $Tx_n$ for wavelength multiplexing and outputs the wavelength multiplexed signal to the transmission path 3.

The respective laser light sources 11 of the optical transmitters $Tx_1$ through $Tx_n$ are different light source out of frequency synchronization with one another for each sub-channel or each sub-channel group.

The respective carrier-wave frequency control circuits 16 of the optical transmitters $Tx_1$ through $Tx_n$ fine-adjust the carrier-wave frequency of light signals output from the optical modulators 15, 15A, or 15C by controlling the cycles of the phase rotations that the phase rotating circuits 122, 122X, or 122Y apply.

The respective carrier-wave frequency control circuits 16 of the optical transmitters $Tx_1$ through $Tx_n$ output different amounts $\Delta f_{a1}$ through $\Delta f_{an}$ of frequency control to the phase rotating circuits 122, 122X, or 122Y. As illustrated in FIG. 18, the intervals of the center frequencies of the light signals output from the optical modulators 15, 15A, or 15C are adjusted to a value of constant times the symbol rate (N×symbol rate, where N is a natural number).

Accordingly, even if the oscillation frequency of the laser light sources 11 are out of synchronization in the optical transmitter unit 100C, the use of the functions of the respective carrier-wave frequency control circuits 16 can adjust the intervals of the center frequencies of the light signals output from the optical transmitters $Tx_1$ through $Tx_n$ to a value of constant times the symbol rate. Thereby, the frequencies of light signals output from the optical transmitters $Tx_1$ through $Tx_n$ are synchronized, so that OFDM (Orthogonal Frequency Division Multiplexing) can be realized.

Figure 19:
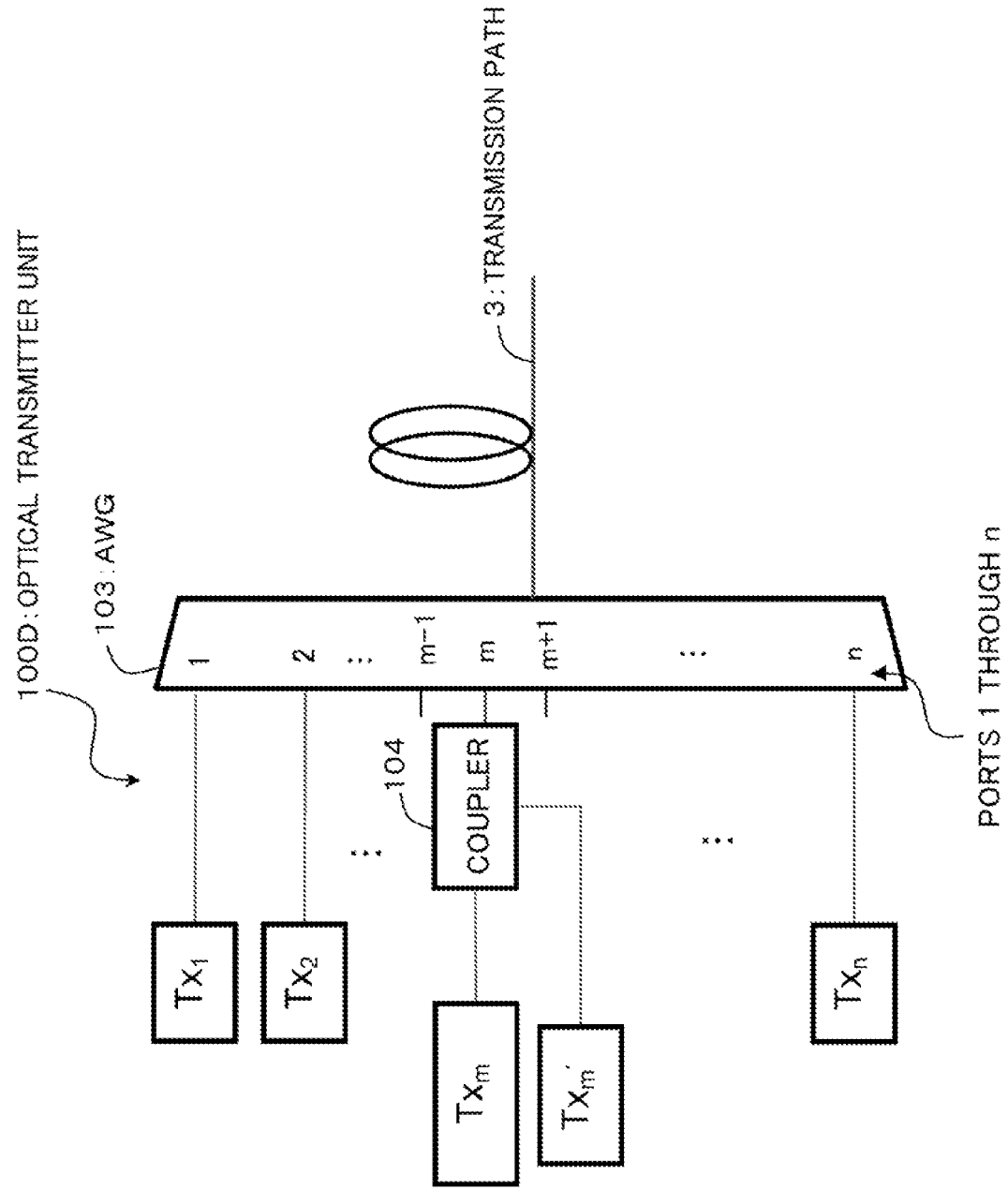
FIG. 19 is a block diagram schematically illustrating the configuration of an optical transmitter unit according to a fourth example.
Figure 20:
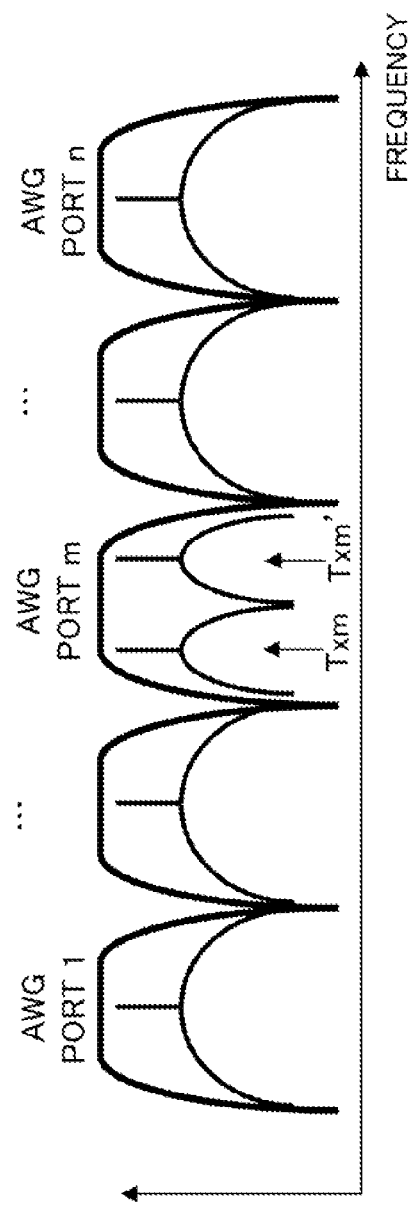
FIG. 20 is a diagram illustrating a transmitting spectrum of an optical transmitter unit of FIG. 19.

(9) Fourth Example of an Optical Transmitter Unit:

A description will now be made in relation to the optical transmitter unit according to a fourth example with reference to FIGS. 19 and 20. FIG. 19 is a block diagram schematically illustrating the configuration of the optical transmitter unit of the fourth example; and FIG. 20 is a diagram illustrating a transmitting spectrum of the optical transmitter unit of FIG. 20.

As illustrated in FIG. 19, the optical transmitter unit 100D of the fourth example includes a number (n+1 in FIG. 19) of $Tx_1, Tx_2, \ldots, Tx_m, Tx_m', \ldots$, and $Tx_n$, an AWG 103, and the coupler 104. Here, the number "m" represents a natural number of n or less.

The optical transmitters $Tx_2, Tx_2, \ldots, Tx_m, Tx_m', \ldots, Tx_n$ is the same of the optical transmitters 1, 1A through 1C illustrated in FIGS. 1 through 8.

The AWG (Arrayed Waveguide Gratings) 103 is an optical coupler having fixed filtering bands that includes n ports 1 through n and that combines light signals input through the ports 1 through n from the optical transmitters $Tx_2$ through $Tx_n$ for wavelength multiplexing and outputs the wavelength multiplexed signal to the transmission path 3. As illustrated in FIG. 20, filtering bands are fixedly allocated one to each of the ports 1 through n.

Here, the optical transmitters $Tx_m$ and $Tx_m'$ transmit signals having bit rates lower than those of the remaining optical transmitters, and are connected to a port m of the AWG 103 via a coupler 104 that combines signals from the optical transmitters $Tx_m$ and $Tx_m'$.

The optical transmitters $Tx_1$ through $Tx_{m-1}$, and $Tx_{m+1}$ through $Tx_n$ are connected to ports 1 through m−1, abd m+1 through n of the AWG 103, respectively.

The carrier-wave frequency control circuits 16 of the optical transmitters $Tx_1$ through $Tx_{m-1}$, and $Tx_{m+1}$ through $Tx_n$ controls the cycles of the phase rotations that the phase rotating circuits 122, 122X, or 122Y apply, so that one of the filtering bands of the AWG 103 is shared by two or more of the optical transmitters. Specifically, in the optical transmitter unit 100D of FIG. 19, the functions of the carrier-wave frequency control circuits 16 precisely adjust the carrier-wave frequencies of two optical transmitters $Tx_m$ and $Tx_m'$ on a particular path input into the port m at a high speed. Thereby, the filtering band corresponding to the port m of the AWG 103 is shared by two optical transmitters $Tx_m$ and $Tx_m'$, as illustrated in FIG. 20.

Accordingly, in the optical transmitter unit 100D of the fourth example, the use of the AWG 103 makes it possible to combine two or more optical transmitters $Tx_m$ and $Tx_m'$ having low bit rates by the coupler 104, and the functions of the respective carrier-wave frequency control circuits 16 control the carrier-wave frequencies of the optical transmitters $Tx_1$ through $Tx_n$. Thereby, one of filtering bands of the AWG 103 is shared by such two or more optical transmitters $Tx_m$ and $Tx_m'$ having low bit rates, so that the respective filtering band of the AWG 103 can be efficiently used.

The example of FIGS. 19 and 20 assume that one of the filtering bands of the AWG 103 is shared by two optical transmitters $Tx_m$ and $Tx_m'$. However, the number of optical transmitters should by no means be limited to two. Alternatively, the carrier-wave frequencies of the optical transmitters $Tx_1$ through $Tx_n$ may be controlled by the functions of the carrier-wave frequency control circuits 16 such that one of the filtering bands is shared by three or more optical transmitters.

Figure 21:
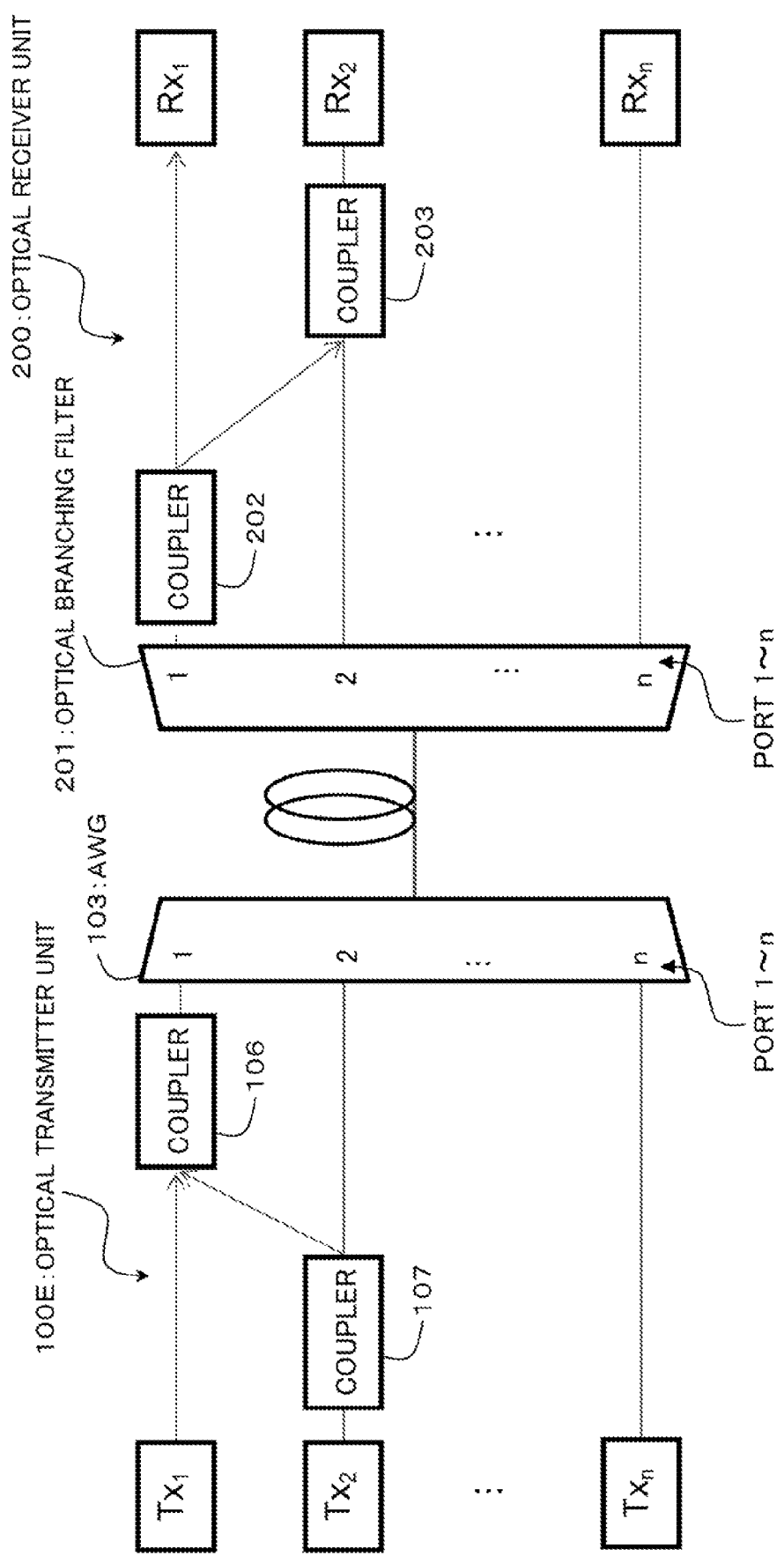
FIG. 21 is a block diagram schematically illustrating the configuration of an optical transmitter unit according to a fifth example and an optical receiver unit.

(10) Fifth Example of an Optical Transmitter Unit:

Description will now be made in relation to an optical transmitter unit according to a fifth example, and an optical receiver unit corresponding to the optical transmitter unit with reference to FIGS. 21 and 22. FIG. 21 is a block diagram illustrating the configurations of the optical transmitter unit of the fifth example and the corresponding optical receiver unit, and FIG. 22 is a diagram illustrating the transmission spectrum of the optical transmitter unit of FIG. 21.

As illustrated in FIG. 21, an optical transmitter unit 100E of the fifth example includes a number (n in FIG. 21) of optical transmitters $Tx_1$ through $Tx_n$, an AWG 103, and couplers 105 and 106.

The optical receiver unit 200 corresponding to the optical transmitter unit 100E is connected to the optical transmitter unit 100E via the transmission path (optical fiber) 3, and includes a number (n in FIG. 21) optical receivers $Rx_1$ through $R_n$, an optical branching filter 201, and couplers 202 and 203.

The optical transmitters $Tx_1$ through $Tx_n$ are the same one of the optical transmitters 1, 1A through 1C of FIGS. 1 through 8.

The AWG 103 is an optical coupler having fixed filtering bands that includes n ports 1 through n and that combines light signals input via the couplers 105 and 106 from the optical transmitters $Tx_1$ through $Tx_n$ for wavelength multiplexing and outputs the wavelength multiplexed signal to the transmission path 3. As illustrated in FIG. 22, filtering bands are fixedly allocated one to each of the ports 1 through n.

The modulation scheme of the modulating scheme mapping circuits 121 of the optical transmitters $Tx_1$ through $Tx_n$ in the optical transmitter unit 100E adopt an Orthogonal Frequency Division Multiplexing (OFDM) scheme (see FIG. 22).

If a light signal from one of the optical transmitters $Tx_1$ through $Tx_n$ (in the example of FIG. 22, the optical transmitters $Tx_2$ and $Tx_5$) extends two filtering band of the AWG 103, the carrier-wave frequency control circuits 16 of the optical transmitters $Tx_2$ and $Tx_5$ conduct the following control.

Specifically, the carrier-wave frequency control circuits 16 control the cycles of the phase rotations that the phase rotating circuits 122, 122X, or 122Y provide, and thereby control the carrier-wave frequencies of the light signals output from the optical modulators 15, 15A or 15C of the optical transmitters $Tx_2$ and $Tx_5$ such that the particular sub-carrier of the light signals from the optical transmitters $Tx_2$ and $Tx_5$ position at the guard band between the two filtering bands as illustrated in FIG. 22. At that time, the optical transmitters $Tx_2$ and $Tx_5$ prohibit use of the sub-carrier disposed at the guard bands.

The optical receivers $Rx_1$ through $Rx_n$ in the optical receiver unit 200 is, for example, the same one of the optical receivers 2A and 2B of FIGS. 10 and 11.

The optical branching filter 201 receives a wavelength multiplexed light signal from the optical transmitter unit 100E through the transmission path 3, separates the received wavelength multiplexed light signal into n signals, and outputs the n signals one from each of the ports 1 through n to the optical receivers $Rx_1$ through $Rx_n$ via the couplers 202 and 203.

The coupler 202 corresponds to the coupler 106 of the transmitter end, and divides a signal from the port 1 of the optical branching filter 201 into two signals, one of which is output to the optical receiver $Rx_1$. The coupler 203 corresponds to the coupler 105 of the transmitter end, combines the other signal from the coupler 202, the signal from the port 2 of the branching filter 201, and outputs the combined signal to the optical receiver $Rx_2$.

According to the optical transmitter unit 100E of the fifth example, the optical transmitters $Tx_1$ through $Tx_n$ each carry out high-dense multiplexing through an OFDM scheme regardless of the filtering bandwidth of the AWG 103, and precisely control the carrier-wave frequencies of the respective channels (optical transmitters $Tx_1$ through $Tx_n$) at a high speed such that only particular sub-carrier of each particular channel is disposed at the position of the guard band. Then, use of the particular sub-band positioning at the guard band is prohibited. Thereby, it is possible to surely avoid vain transmission processing through the sub-carrier of the guard band, so that transmission efficiency by OFDM in the optical network can be further enhanced.

(11) Others;

The preferable embodiments of the present invention are described as above. The present invention should by no means be limited to the foregoing embodiments, and various changes and modifications can be suggested without departing from the gist of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention.

What is claimed is:

1. An optical transmitter comprising:
   a light source;
   a signal processor that carries out digital signal processing on a transmitting signal to be transmitted;
   an optical modulator that modulates output light from the light source in accordance with the transmitting signal subjected to the digital signal processing in the signal processor and outputs the modulated light as a light signal to a transmission path; and
   a carrier-wave frequency control circuit that controls a carrier-wave frequency of the light signal output from the optical modulator,
   the signal processor comprising a mapping circuit that maps the transmitting signal to electric-field information according to a modulating scheme, and a phase rotating circuit that provides a phase rotation having a constant cycle to an electric-field phase of the electric-field information to which the mapping circuit maps the transmitting signal, the carrier-wave frequency control circuit controlling the cycle of the phase rotation that the phase rotating circuit provides and thereby controlling the carrier-wave frequency of the light signal output from the optical modulator.

2. The optical transmitter according to claim 1, wherein:

the electric-field information to which the mapping circuit maps the transmitting signal includes an I (In-phase) component and a Q (Quadrature-phase) component;

the optical modulator modulates the output light from the light source in accordance with the I component and the Q component of the transmitting signal subjected to the digital signal processing in the signal processor; and the signal processor further comprises an I-channel predistortion compensating circuit that compensates the I component of the electric-field information, to which the phase rotating circuit provides the phase rotation, for a prospective signal quality deterioration of a transmission system corresponding to the I component, and a Q-channel predistortion compensating circuit that compensates the Q component of the electric-field information, to which the phase rotating circuit provides the phase rotation, for a prospective signal quality deterioration of a transmission system corresponding to the Q component.

3. The optical transmitter according to claim 1, wherein the signal processor further comprises a transmission-path predistortion compensating circuit that provides a distortion, having an opposite property to that of a signal quality distortion due to the transmission path, to the electric-field information to which the mapping circuit maps the transmitting signal, and thereby compensates for the signal quality distortion due to the transmission path.

4. The optical transmitter according to claim 1, wherein:

the optical modulator comprises a polarization multiplexing modulator that carries out optical modulation independently of each other on polarization components orthogonal to each other;

the signal processor further comprises a separator that separates the transmitting signal into two branch signals corresponding one to each of the polarization components orthogonal to each other, two of the mapping circuits provided one for each of the two branch signals, and two of the phase rotating circuits provided one for each of the two branch signals.

5. The optical transmitter according to claim 4, wherein the electric-field information to which each of the mapping circuits maps the transmitting signal includes an I (In-phase) component and a Q (Quadrature-phase) component;

the optical modulator modulates the output light from the light source in accordance with two of the I components and two of the Q components of the two branch signals subjected to the digital signal processing in the signal processor, the signal processor further comprises two I-channel predistortion compensating circuits each of which is provided for one of the two branch signals and each of which compensates the I component of the electric-field information, to which the phase rotating circuit provides the phase rotation, for a prospective signal quality deterioration of a transmission system corresponding to the I component, and two Q-channel predistortion compensating circuits each of which is provided for one of the two branch signals and each of which compensates the Q component of the electric-field information, to which the phase rotating circuit provides the phase rotation, for a prospective signal quality deterioration of a transmission system corresponding to the Q component.

6. The optical transmitter according to claim 4, wherein the signal processor further comprises transmission-path predistortion compensating circuits each of which is provided for one of the two branch signals and which compensates the electric-field information, to which each of the mapping circuits maps the transmitting signal, for a prospective signal quality distortion due to the transmission path.

7. The optical transmitter according to claim 1, wherein the carrier-wave frequency control circuit superimposes a pilot signal onto the carrier-wave frequency of the light signal output from the optical modulator through frequency modulation by controlling the cycle of the phase rotation that the phase rotating circuit provides to thereby control the carrier-wave frequency of the light signal output from the optical modulator, and transmits the superimposed signal to a receiver end through the transmission path.

8. The optical transmitter according to claim 7, wherein the carrier-wave frequency control circuit superimposes, as the pilot signal, a result of detecting quality of a light signal, output from a station including a receiver opposing to the optical transmitter and received through a reverse-direction path, onto the carrier-wave frequency through the frequency modulation.

9. The optical transmitter according to claim 1, wherein the carrier-wave frequency control circuit superimposes a dither for detecting quality of a received signal onto the carrier-wave frequency of the light signal output from the optical modulator by controlling the cycle of the phase rotation that the phase rotating circuit provides to thereby control the carrier-wave frequency of the light signal output from the optical modulator, and transmits the superimposed dither to a receiver end through the transmission path.

10. The optical transmitter according to claim 1, wherein the carrier-wave frequency control circuit controls the carrier-wave frequency of the light signal output from the optical modulator by carrying out both fine adjustment that controls the carrier-wave frequency of the light signal output from the optical modulator by controlling the cycle of the phase rotation that the phase rotating circuit provides and rough adjustment that controls a frequency of the output light from the light source.

11. An optical transmitter unit comprising:

a plurality of optical transmitters defined in claim 1; and an optical coupler that carries out wavelength multiplexing by combining a plurality of the light signals one output from each of the plurality of optical transmitters to the transmission path, wherein a plurality of the light sources, provided one for each of the plurality of optical transmitters, oscillate output light having a same frequency, a plurality of the carrier-wave frequency control circuits, provided one for each of the plurality of optical transmitters, fine-adjust the carrier-wave frequencies of the light signals output from the optical modulators by controlling cycles of the phase rotation that the corresponding phase rotating circuits provide.

12. The optical transmitter unit according to claim 11, wherein the plurality of light sources are a single common light source.

13. An optical transmitter unit comprising:
a plurality of optical transmitters defined in claim 1; and
a variable band optical coupler that carries out wavelength multiplexing by combining a plurality of the light signals one output from each of the plurality of optical transmitters, wherein
a plurality of the carrier-wave frequency control circuits, provided one for each of the plurality of optical transmitters, adjust wavelength arrangement matching bit rates of a plurality of the transmitting signals by controlling the cycles of the phase rotations that a plurality of the phase rotating circuits provide.

14. The optical transmitter according to claim 13, wherein the plurality of carrier-wave frequency control circuits adjust the wavelength arrangement also using rough adjustment that controls frequencies of the output light from a plurality of the light sources.

15. The optical transmitter according to claim 13, wherein the plurality of carrier-wave frequency control circuits change the wavelength arrangement by controlling the cycles of the phase rotations that the plurality of phase rotating circuits provide.

16. The optical transmitter according to claim 15, wherein the plurality of carrier-wave frequency control circuits change the wavelength arrangement also using rough adjustment that controls frequencies of the output lights from a plurality of the light sources.

17. An optical transmitter unit comprising:
a plurality of optical transmitters defined in claim 1; and
an optical coupler that carries out wavelength multiplexing by combining a plurality of the light signals one output from each of the plurality of optical transmitters to the transmission path, wherein
a plurality of the carrier-wave frequency control circuits, provided one for each of the plurality of optical transmitters, adjust the intervals of center carrier frequencies of the light signals output from the plurality of optical transmitters to constant times symbol rates by controlling the cycles of the phase rotations that the corresponding phase rotating circuits provide to thereby control the carrier-wave frequencies of the light signals output from a plurality of the optical modulators.

18. An optical transmitter unit comprising:
a plurality of optical transmitters defined in claim 1; and
an optical coupler that has a fixed filtering band and that carries out wavelength multiplexing by combining a plurality of the light signals one output from each of the plurality of optical transmitters to the transmission path, wherein
a plurality of the carrier-wave frequency control circuits, provided one for each of the plurality of optical transmitters, cause two or more of the plurality of optical transmitters to share an identical filtering band of the optical coupler by controlling the cycles of the phase rotations that the corresponding phase rotating circuits provide to thereby control the carrier-wave frequencies of the light signals output from a plurality of the optical modulators.

19. An optical transmitter unit comprising:
a plurality of optical transmitters defined in claim 1; and
an optical coupler that has fixed filtering bands and that carries out wavelength multiplexing by combining a plurality of the light signals one output from each of the plurality of optical transmitters to the transmission path, wherein
a plurality of the mapping circuits, provided one for each of the plurality of optical transmitters, adopt an Orthogonal Frequency Division Multiplexing (OFDM) scheme, and
when a first optical transmitter included in the plurality of optical transmitters outputs the light signal that extends two filtering bands of the optical coupler, the carrier-wave frequency control circuit of the first optical transmitter controls the cycle of the phase rotation that the corresponding phase rotating circuit provides to thereby control the carrier-wave frequency of the light signal output from the optical modulator of the first optical modulator such that a particular sub-carrier of the light signal from the first optical modulator positions at a guard band between the two filtering bands.

20. The optical transmitter unit according to claim 19, wherein the first optical transmitter prohibits use of the particular sub-carrier disposed at the guard band.

* * * * *